US012677133B2

(12) United States Patent
Hong

(10) Patent No.: US 12,677,133 B2
(45) Date of Patent: Jul. 7, 2026

(54) METHOD FOR SUSPENDING SERVICE AND METHOD FOR INDICATING SUSPENSION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 363 days.

(21) Appl. No.: 18/276,430

(22) PCT Filed: Feb. 9, 2021

(86) PCT No.: PCT/CN2021/076177
§ 371 (c)(1),
(2) Date: Aug. 8, 2023

(87) PCT Pub. No.: WO2022/170457
PCT Pub. Date: Aug. 18, 2022

(65) Prior Publication Data
US 2024/0121592 A1     Apr. 11, 2024

(51) Int. Cl.
*H04W 8/18* (2009.01)
*H04W 4/50* (2018.01)
*H04W 88/06* (2009.01)

(52) U.S. Cl.
CPC .............. *H04W 8/183* (2013.01); *H04W 4/50* (2018.02); *H04W 88/06* (2013.01)

(58) Field of Classification Search
CPC ...... H04W 8/183; H04W 76/19; H04W 8/205
See application file for complete search history.

(56) References Cited

U.S. PATENT DOCUMENTS

| | | | | |
|---|---|---|---|---|
| 2017/0318560 A1* | 11/2017 | Xu | ......................... | H04W 72/30 |
| 2018/0160422 A1 | 6/2018 | Pathak et al. | | |
| 2021/0014934 A1 | 1/2021 | Lovlekar et al. | | |
| 2021/0160829 A1* | 5/2021 | Park | ..................... | H04L 1/0003 |
| 2022/0240213 A1* | 7/2022 | Ly | ......................... | H04W 60/04 |
| 2022/0256630 A1* | 8/2022 | Wu | ........................ | H04W 76/15 |
| 2022/0312538 A1* | 9/2022 | Zhang | ................. | H04W 68/005 |
| 2022/0418020 A1* | 12/2022 | Adjakple | ............ | H04W 60/005 |
| 2023/0254918 A1* | 8/2023 | Gurumoorthy | ......... | H04W 8/24 |
| | | | | 455/435.1 |

FOREIGN PATENT DOCUMENTS

| | | |
|---|---|---|
| CN | 105635985 A | 6/2016 |
| CN | 109587677 A | 4/2019 |

(Continued)

OTHER PUBLICATIONS

European Patent Application No. 21925138.6 Search and Opinion dated Mar. 15, 2024, 8 pages.

(Continued)

*Primary Examiner* — Dhaval V Patel
(74) *Attorney, Agent, or Firm* — Cozen O'Connor

(57) ABSTRACT

A method for suspending a service, performed by a base station, includes: receiving indication information that a first subscriber identification module (SIM) in a multi-SIM terminal leaves a connected state; and determining to suspend a service corresponding to the first SIM according to a local configuration of the base station.

20 Claims, 12 Drawing Sheets receiving indication information that a first SIM in a multi-SIM terminal leaves a connected state ⟩~ S101 determining to suspend a service corresponding to the first SIM according to a local configuration of the base station ⟩~ S102

(56) References Cited

FOREIGN PATENT DOCUMENTS

| | | | |
|---|---|---|---|
| CN | 111758282 | A | 10/2020 |
| CN | 112218283 | A | 1/2021 |
| WO | WO 2020209620 | A1 | 10/2020 |
| WO | WO 2021007735 | A1 | 1/2021 |

OTHER PUBLICATIONS

Apple Inc, "Methods for Multi-SIM Network Switching", 3GPP TSG-RAN WG2 Meeting #112e, R2-2009506, Nov. 2020, 8 pages.
PCT/CN2021/076177, International Search Report dated Oct. 29, 2021, 2 pages.

* cited by examiner

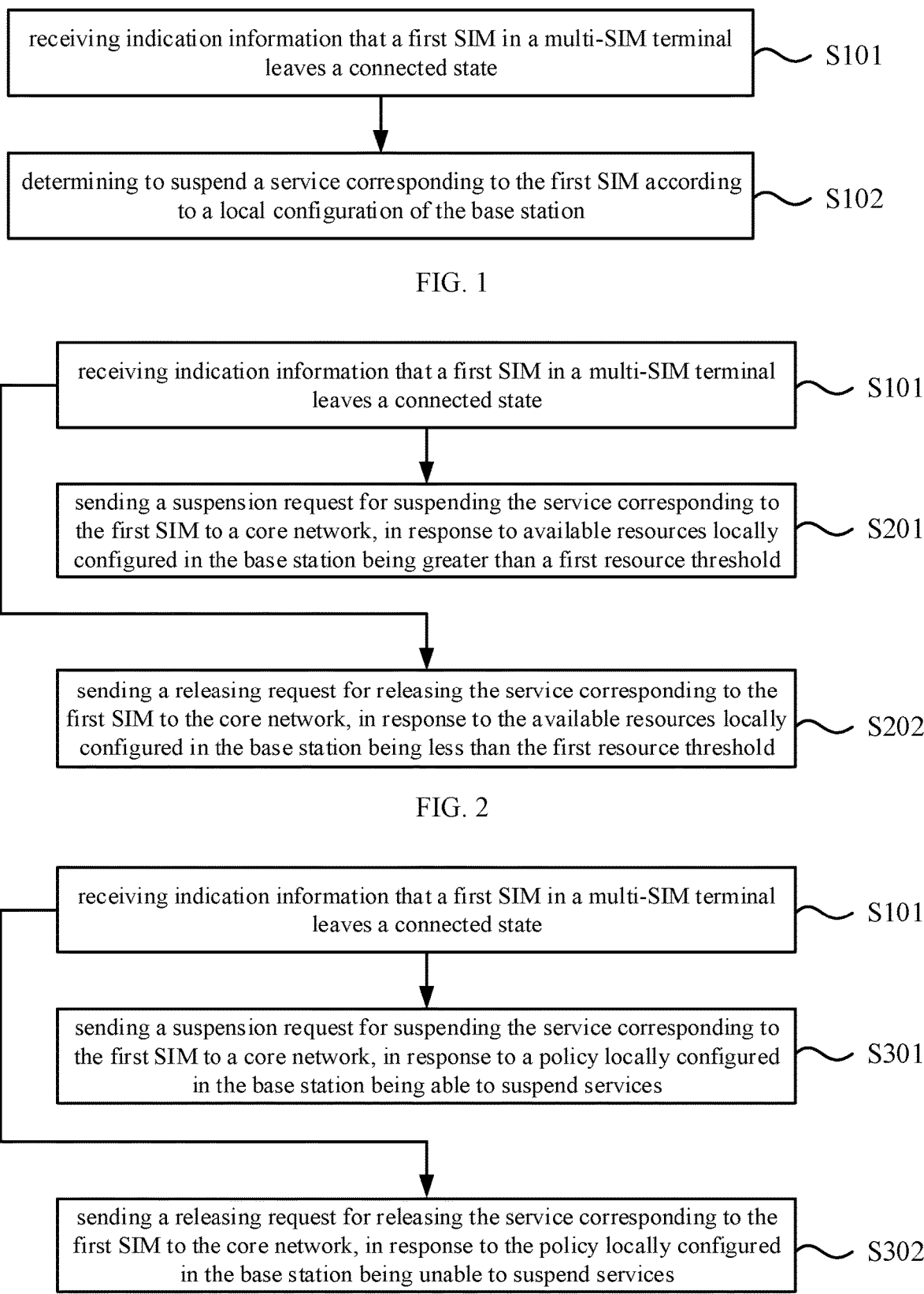

receiving indication information that a first SIM in a multi-SIM terminal leaves a connected state — S101 determining to suspend a service corresponding to the first SIM according to a local configuration of the base station — S102

FIG. 1 receiving indication information that a first SIM in a multi-SIM terminal leaves a connected state — S101 sending a suspension request for suspending the service corresponding to the first SIM to a core network, in response to available resources locally configured in the base station being greater than a first resource threshold — S201 sending a releasing request for releasing the service corresponding to the first SIM to the core network, in response to the available resources locally configured in the base station being less than the first resource threshold — S202

FIG. 2 receiving indication information that a first SIM in a multi-SIM terminal leaves a connected state — S101 sending a suspension request for suspending the service corresponding to the first SIM to a core network, in response to a policy locally configured in the base station being able to suspend services — S301 sending a releasing request for releasing the service corresponding to the first SIM to the core network, in response to the policy locally configured in the base station being unable to suspend services — S302

FIG. 3

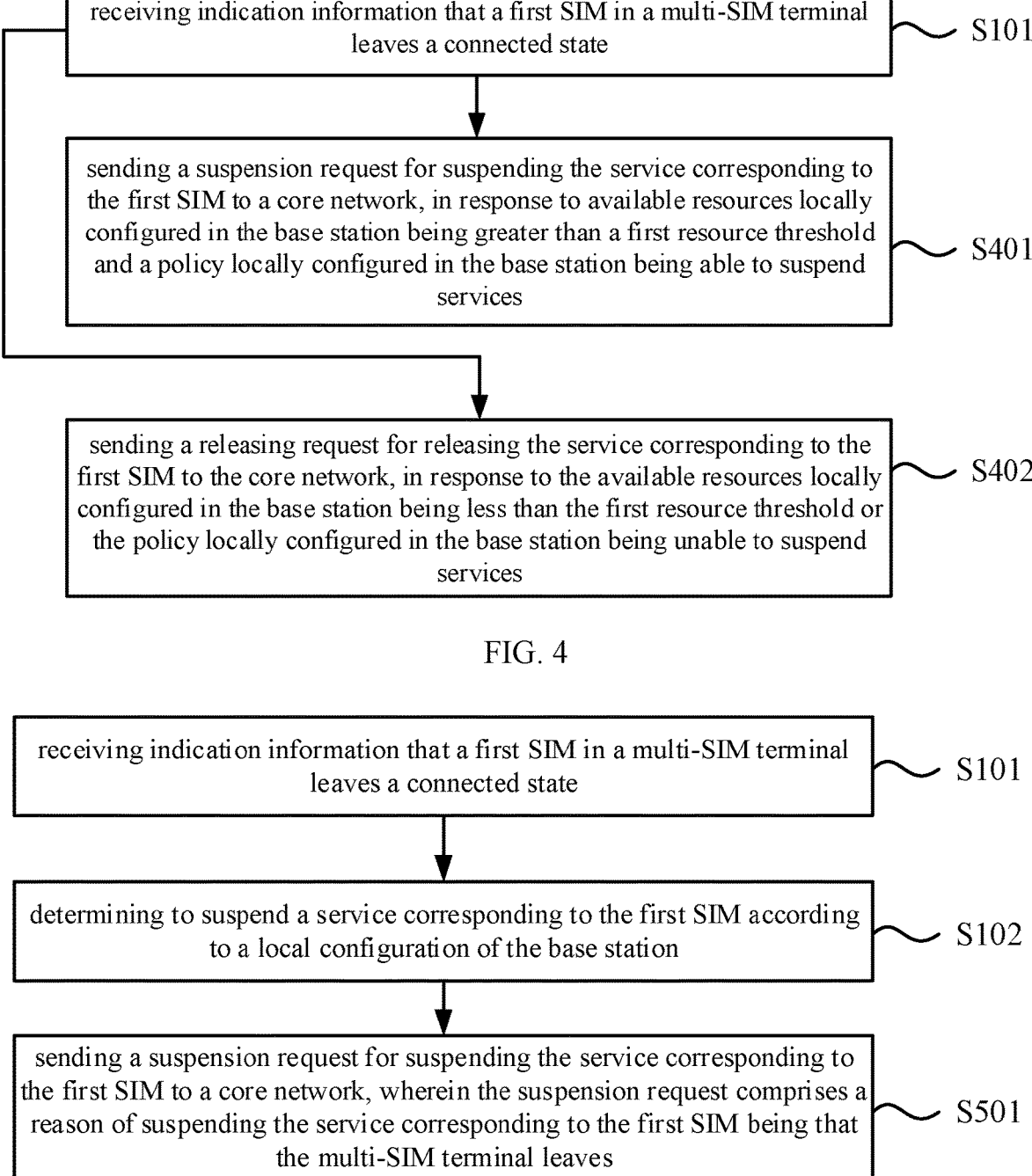

receiving indication information that a first SIM in a multi-SIM terminal leaves a connected state          S101 sending a suspension request for suspending the service corresponding to the first SIM to a core network, in response to available resources locally configured in the base station being greater than a first resource threshold and a policy locally configured in the base station being able to suspend services          S401 sending a releasing request for releasing the service corresponding to the first SIM to the core network, in response to the available resources locally configured in the base station being less than the first resource threshold or the policy locally configured in the base station being unable to suspend services          S402

FIG. 4 receiving indication information that a first SIM in a multi-SIM terminal leaves a connected state          S101 determining to suspend a service corresponding to the first SIM according to a local configuration of the base station          S102 sending a suspension request for suspending the service corresponding to the first SIM to a core network, wherein the suspension request comprises a reason of suspending the service corresponding to the first SIM being that the multi-SIM terminal leaves          S501

FIG. 5

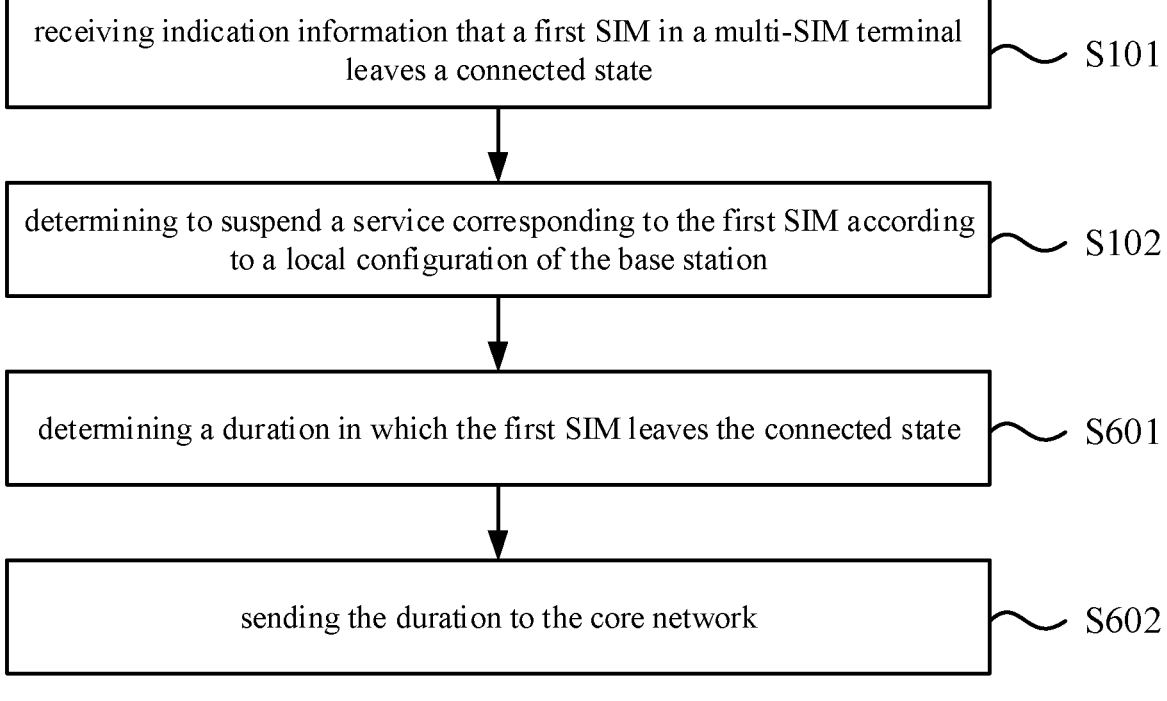

receiving indication information that a first SIM in a multi-SIM terminal leaves a connected state          ~ S101 determining to suspend a service corresponding to the first SIM according to a local configuration of the base station          ~ S102 determining a duration in which the first SIM leaves the connected state          ~ S601 sending the duration to the core network          ~ S602

FIG. 6 receiving a suspension request for suspending a service corresponding to a first SIM in a multi-SIM terminal from a base station, wherein the suspension request comprises a reason of suspending the service corresponding to the first SIM being that the multi-SIM terminal leaves          ~ S701 determining to suspend the service corresponding to the first SIM according to the reason and a local configuration of the core network          ~ S702

FIG. 7

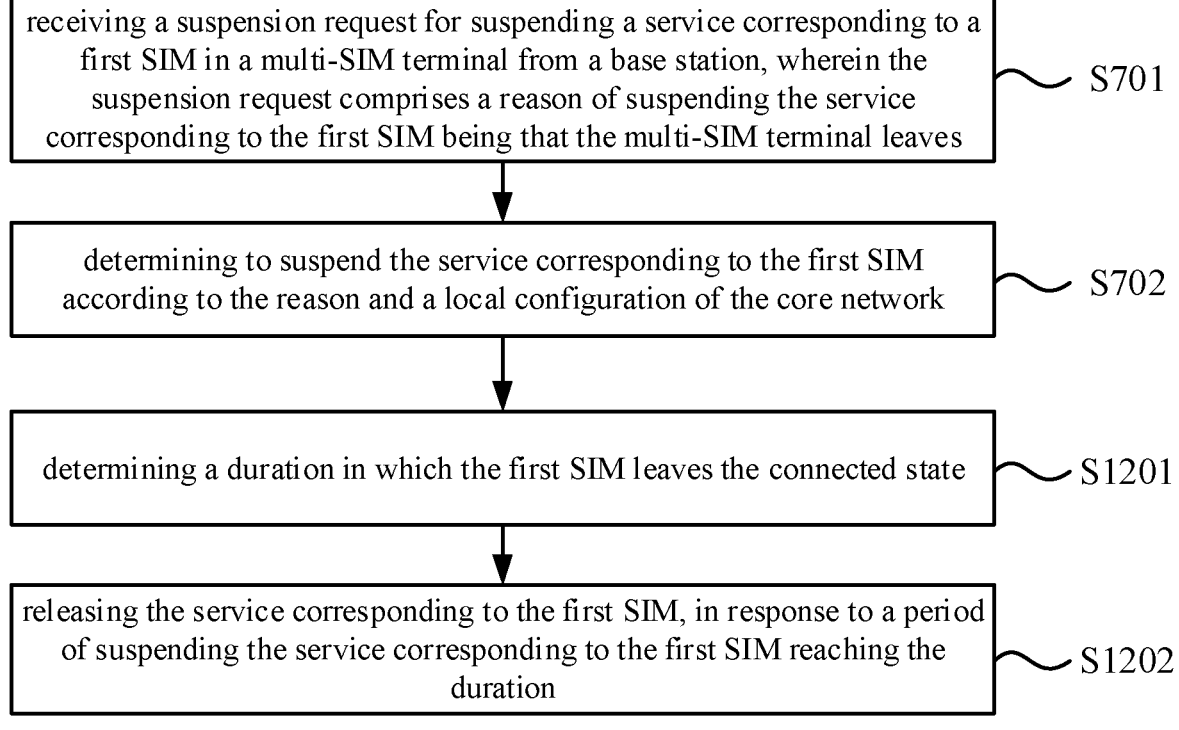

receiving a suspension request for suspending a service corresponding to a first SIM in a multi-SIM terminal from a base station, wherein the suspension request comprises a reason of suspending the service corresponding to the first SIM being that the multi-SIM terminal leaves ~ S701 determining to suspend the service corresponding to the first SIM according to the reason and a local configuration of the core network ~ S702 determining a duration in which the first SIM leaves the connected state ~ S1201 releasing the service corresponding to the first SIM, in response to a period of suspending the service corresponding to the first SIM reaching the duration ~ S1202

FIG. 12 sending indication information to a base station and/or a core network in response to a requirement that a first SIM in a terminal leaves a connected state, to enable the base station to determine to suspend a service corresponding to the first SIM according to a local configuration of the base station, and/or to enable the core network to determine to suspend the service corresponding to the first SIM according to a reason of the service corresponding to the first SIM and a local configuration of the core network; wherein the indication information is configured to indicate that the first SIM leaves the connected state ~ S1301

FIG. 13

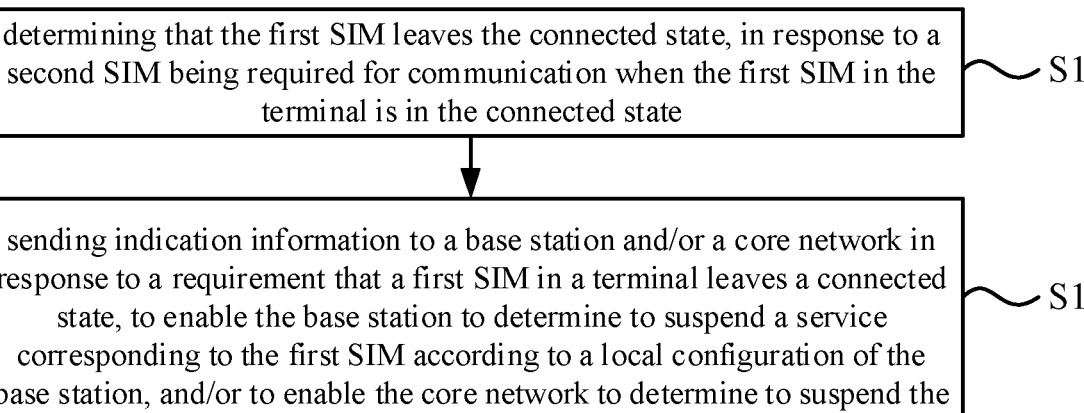

determining that the first SIM leaves the connected state, in response to a second SIM being required for communication when the first SIM in the terminal is in the connected state ⟶ S1402 sending indication information to a base station and/or a core network in response to a requirement that a first SIM in a terminal leaves a connected state, to enable the base station to determine to suspend a service corresponding to the first SIM according to a local configuration of the base station, and/or to enable the core network to determine to suspend the service corresponding to the first SIM according to a reason of the service corresponding to the first SIM and a local configuration of the core network; wherein the indication information is configured to indicate that the first SIM leaves the connected state ⟶ S1301

FIG. 14

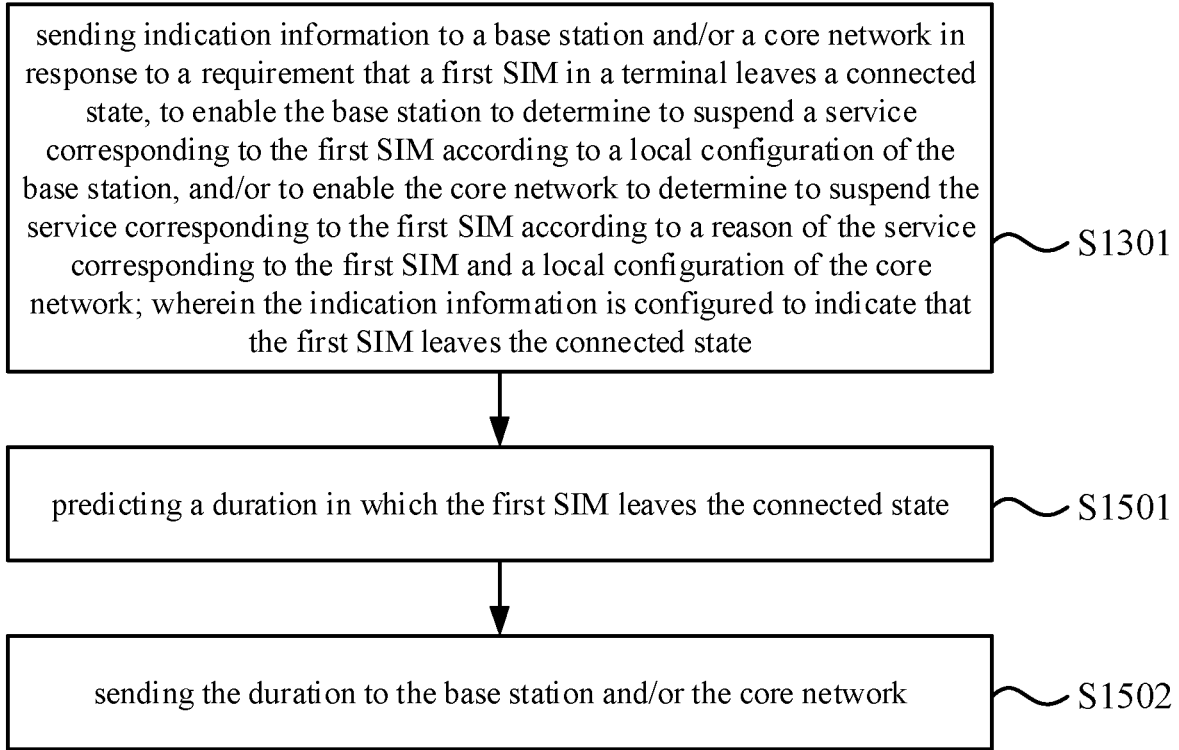

sending indication information to a base station and/or a core network in response to a requirement that a first SIM in a terminal leaves a connected state, to enable the base station to determine to suspend a service corresponding to the first SIM according to a local configuration of the base station, and/or to enable the core network to determine to suspend the service corresponding to the first SIM according to a reason of the service corresponding to the first SIM and a local configuration of the core network; wherein the indication information is configured to indicate that the first SIM leaves the connected state ⟶ S1301 predicting a duration in which the first SIM leaves the connected state ⟶ S1501 sending the duration to the base station and/or the core network ⟶ S1502

METHOD FOR SUSPENDING SERVICE AND METHOD FOR INDICATING SUSPENSION

CROSS-REFERENCE TO RELATED APPLICATION

This application is a national phase of International Application No. PCT/CN2021/076177, filed on Feb. 9, 2021, the entire content of which is incorporated herein by reference.

TECHNICAL FIELD

The disclosure relates to the field of wireless communication technologies, and in particular, to a method for suspending a service and a method for indicating a suspension.

BACKGROUND

Some user equipment (UE) may include more than one subscriber identification modules (SIMs) for connecting to the same or different networks. For a multi-subscriber-identification-module (multi-SIM) terminal, when the terminal needs to use SIM #2 for communication during a communication process using SIM #1, a communication conflict between SIM #1 and SIM #2 occurs.

SUMMARY

According to a first aspect of the disclosure, a method for suspending a service is provided. The method is performed by a base station. The method includes:

receiving indication information that a first SIM in a multi-SIM terminal leaves a connected state; and determining to suspend a service corresponding to the first SIM according to a local configuration of the base station.

According to a second aspect of the disclosure, a method for suspending a service is provided. The method is performed by a core network. The method includes:

receiving a suspension request for suspending a service corresponding to a first SIM in a multi-SIM terminal from a base station, in which the suspension request includes a reason of suspending the service corresponding to the first SIM being that the multi-SIM terminal leaves; and determining to suspend the service corresponding to the first SIM according to the reason and a local configuration of the core network.

According to a third aspect of the disclosure, a method for indicating a suspension is provided. The method is performed by a terminal. The method includes:

sending indication information to a base station and/or a core network in response to a requirement that a first SIM in a terminal leaves a connected state, to enable the base station to determine to suspend a service corresponding to the first SIM according to a local configuration of the base station, and/or to enable the core network to determine to suspend the service corresponding to the first SIM according to a reason of the service corresponding to the first SIM and a local configuration of the core network;

the indication information is configured to indicate that the first SIM leaves the connected state.

BRIEF DESCRIPTION OF THE DRAWINGS

In order to illustrate the technical solutions in the embodiments of the disclosure more clearly, the following briefly introduces the accompanying drawings used in the description of the embodiments. Obviously, the accompanying drawings in the following description are only some embodiments of the disclosure. For a person skilled in the art, other drawings may also be obtained from these drawings without creative labor.

FIG. 1 is a schematic flowchart of a method for suspending a service according to some embodiments of the disclosure.

FIG. 2 is a schematic flowchart of another method for suspending a service according to some embodiments of the disclosure.

FIG. 3 is a schematic flowchart of yet another method for suspending a service according to some embodiments of the disclosure.

FIG. 4 is a schematic flowchart of yet another method for suspending a service according to some embodiments of the disclosure.

FIG. 5 is a schematic flowchart of yet another method for suspending a service according to some embodiments of the disclosure.

FIG. 6 is a schematic flowchart of yet another method for suspending a service according to some embodiments of the disclosure.

FIG. 7 is a schematic flowchart of a method for suspending a service according to some embodiments of the disclosure.

Figures 8, 9:
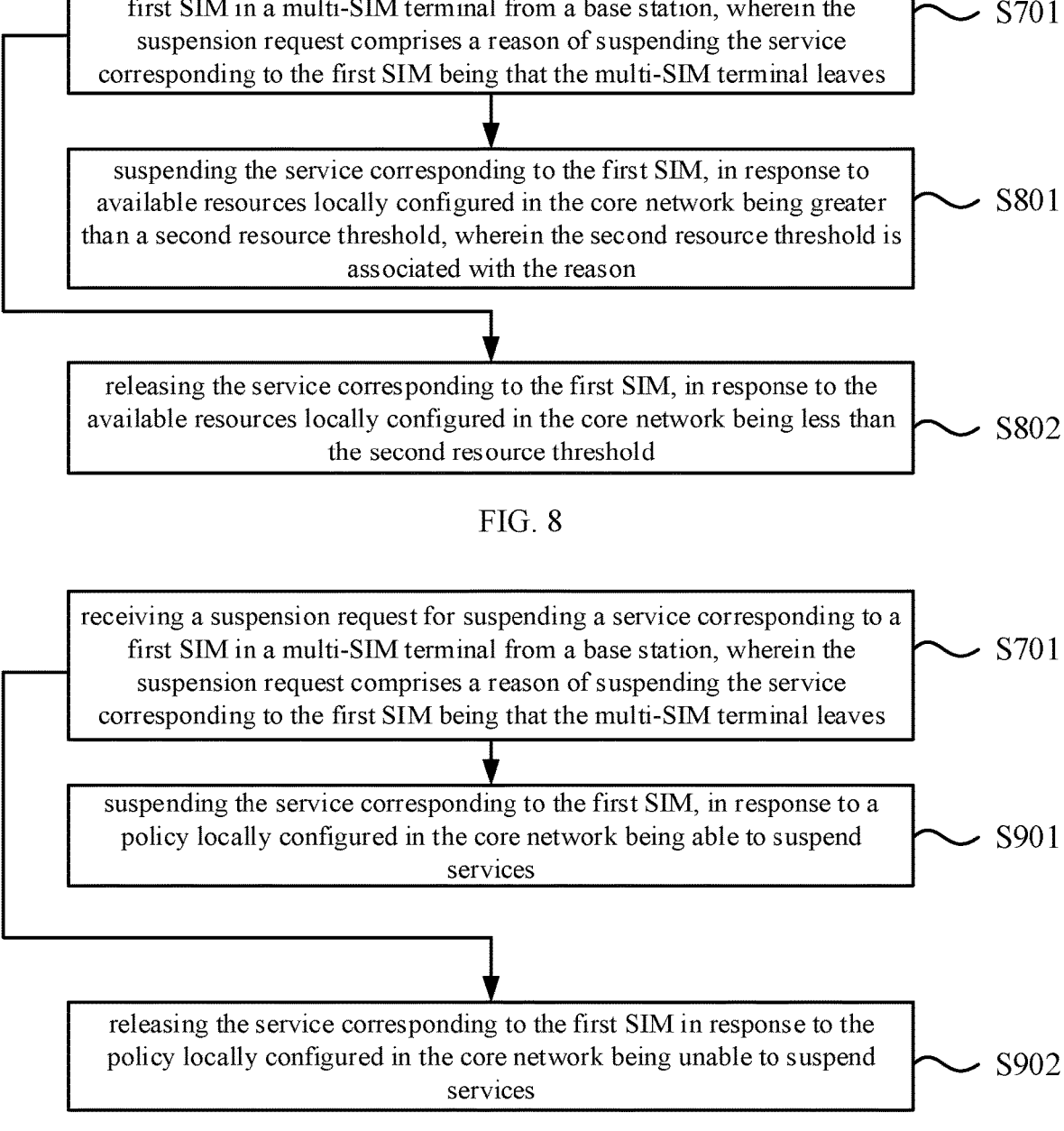

FIG. 8 is a schematic flowchart of another method for suspending a service according to some embodiments of the disclosure.

FIG. 9 is a schematic flowchart of yet another method for suspending a service according to some embodiments of the disclosure.

Figure 10:
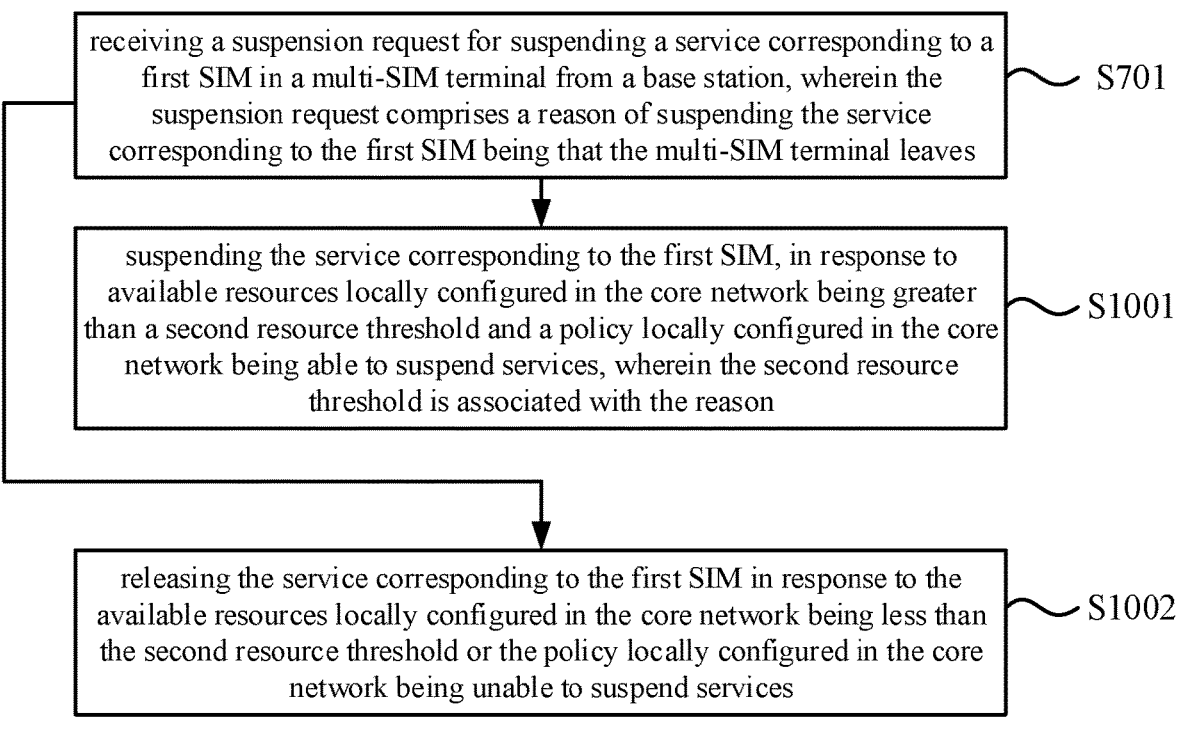

FIG. 10 is a schematic flowchart of yet another method for suspending a service according to some embodiments of the disclosure.

Figure 11:
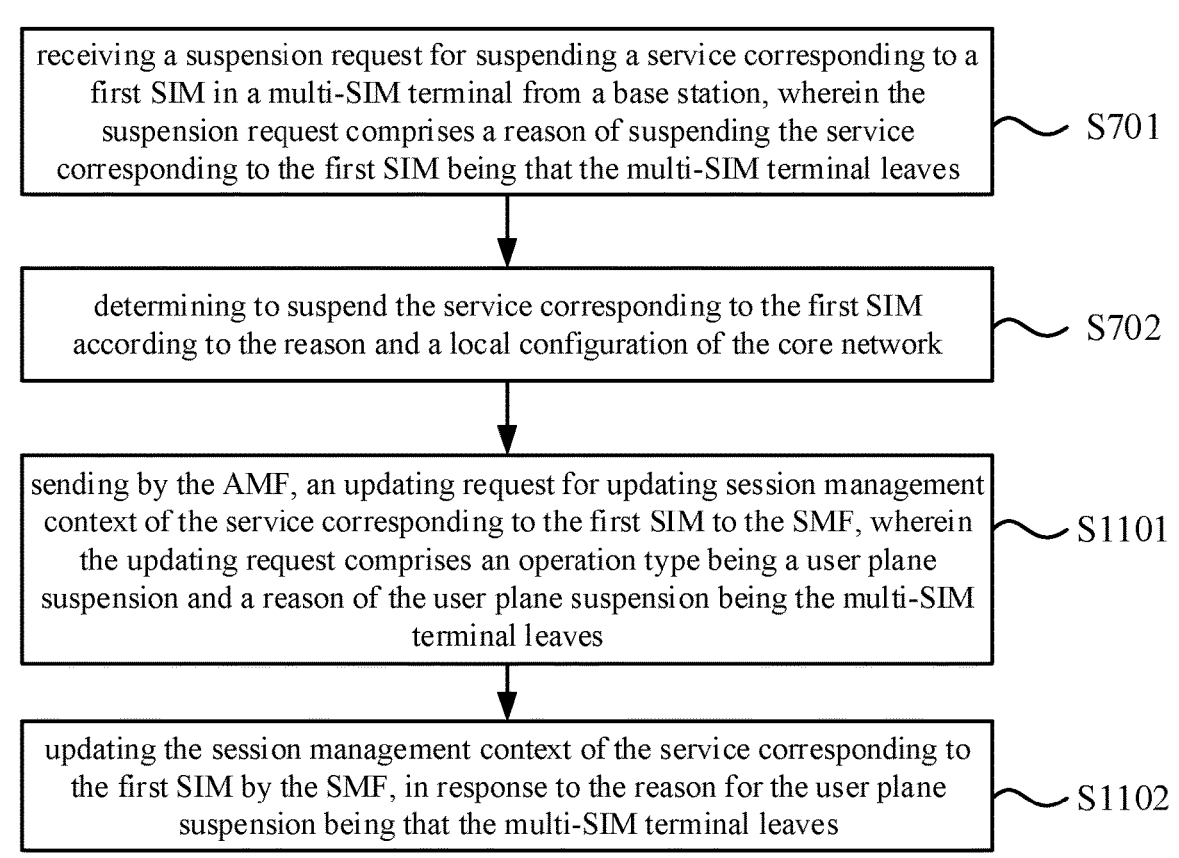

FIG. 11 is a schematic flowchart of yet another method for suspending a service according to some embodiments of the disclosure.

FIG. 12 is a schematic flowchart of yet another method for suspending a service according to some embodiments of the disclosure.

FIG. 13 is a schematic flowchart of a method for indicating a suspension according to some embodiments of the disclosure.

FIG. 14 is a schematic flowchart of another method for indicating a suspension according to some embodiments of the disclosure.

FIG. 15 is a schematic flowchart of another method for indicating a suspension according to some embodiments of the disclosure.

Figure 16:
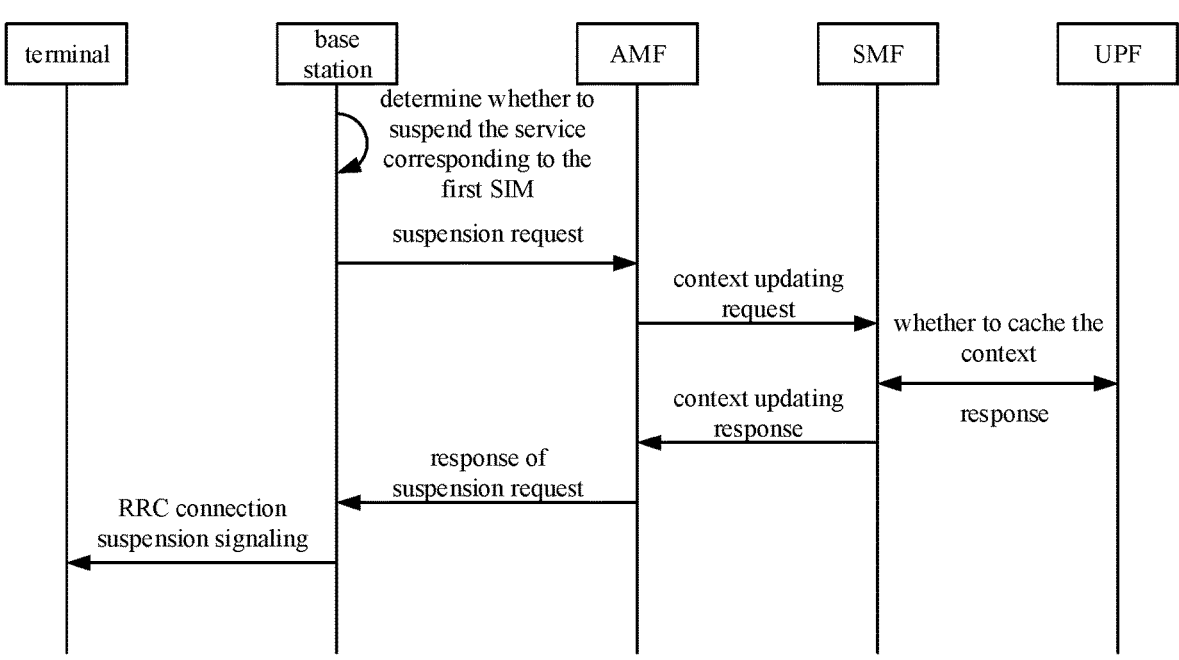

FIG. 16 is a schematic diagram of interaction between a base station and a core network according to some embodiments of the disclosure.

Figure 17:
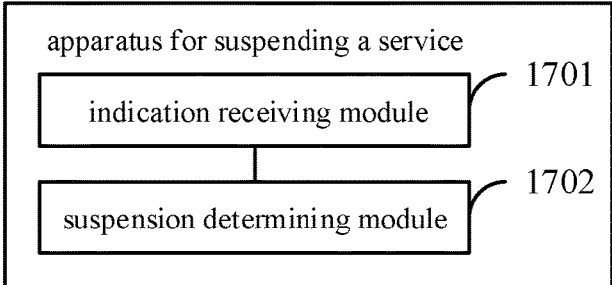

FIG. 17 is a schematic block diagram of an apparatus for suspending a service according to some embodiments of the disclosure.

Figure 18:
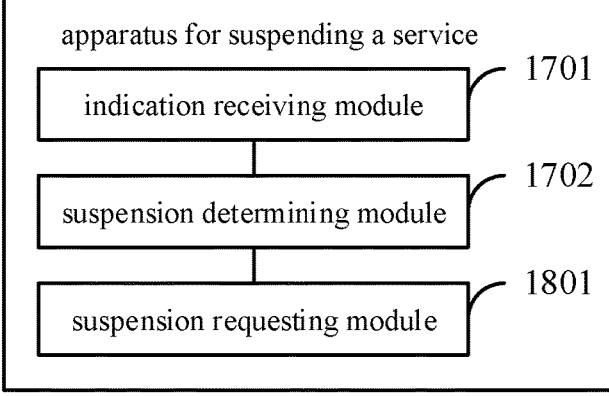

FIG. 18 is a schematic block diagram of another apparatus for suspending a service according to some embodiments of the disclosure.

Figure 19:
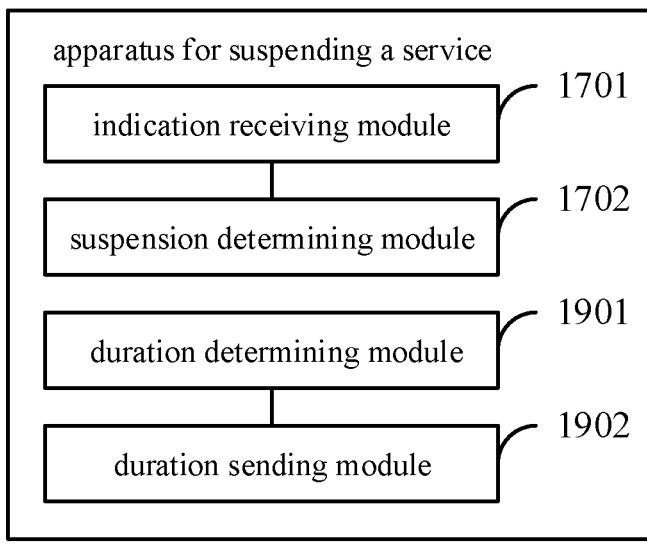

FIG. 19 is a schematic block diagram of yet another apparatus for suspending a service according to some embodiments of the disclosure.

Figure 20:
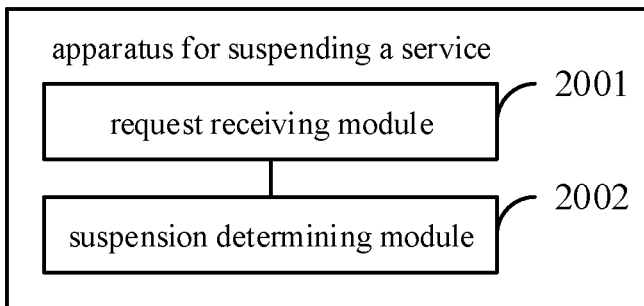

FIG. 20 is a schematic block diagram of an apparatus for suspending a service according to some embodiments of the disclosure.

Figure 21:
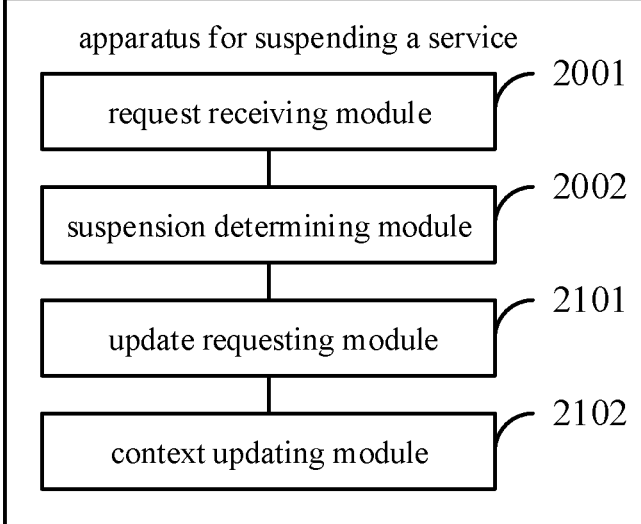

FIG. 21 is a schematic block diagram of another apparatus for suspending a service according to some embodiments of the disclosure.

Figure 22:
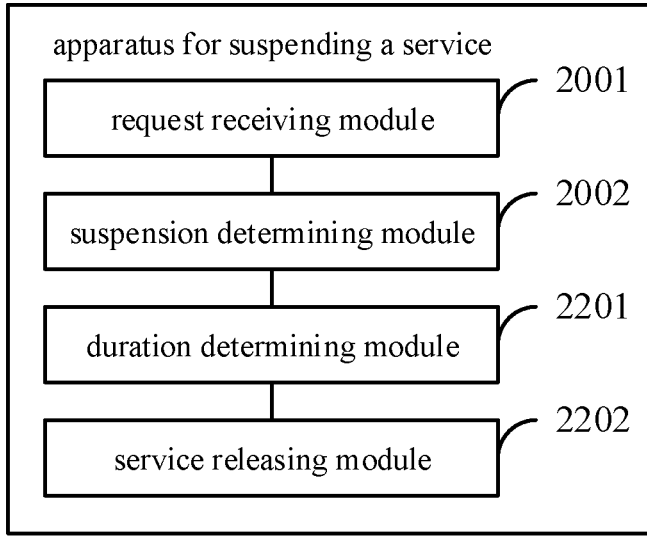

FIG. 22 is a schematic block diagram of yet another apparatus for suspending a service according to some embodiments of the disclosure.

Figure 23:
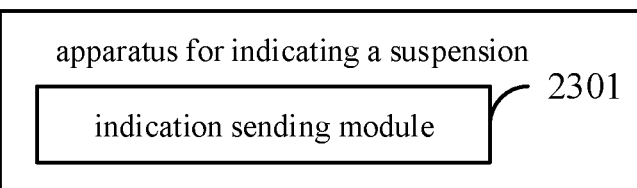

FIG. 23 is a schematic block diagram of an apparatus for indicating a suspension according to some embodiments of the disclosure.

Figure 24:
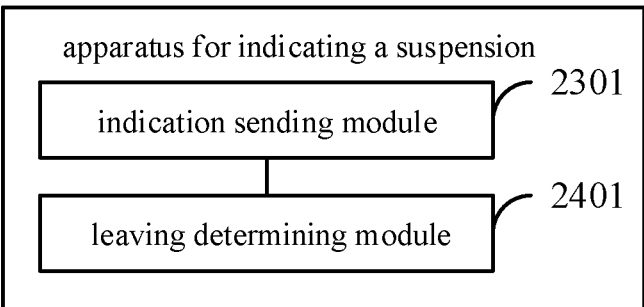

FIG. 24 is a schematic block diagram of another apparatus for indicating a suspension according to some embodiments of the disclosure.

Figure 25:
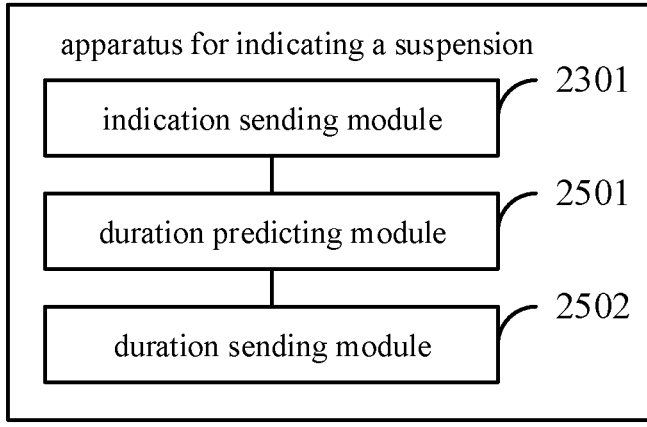

FIG. 25 is a schematic block diagram of yet another apparatus for indicating a suspension according to some embodiments of the disclosure.

Figure 26:
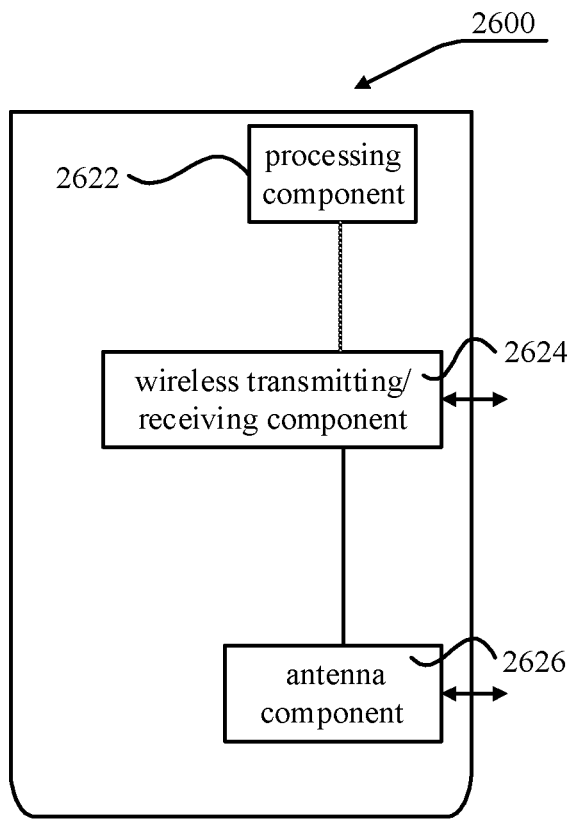

FIG. 26 is a schematic block diagram of a device for suspending a service according to some embodiments of the disclosure.

Figure 27:
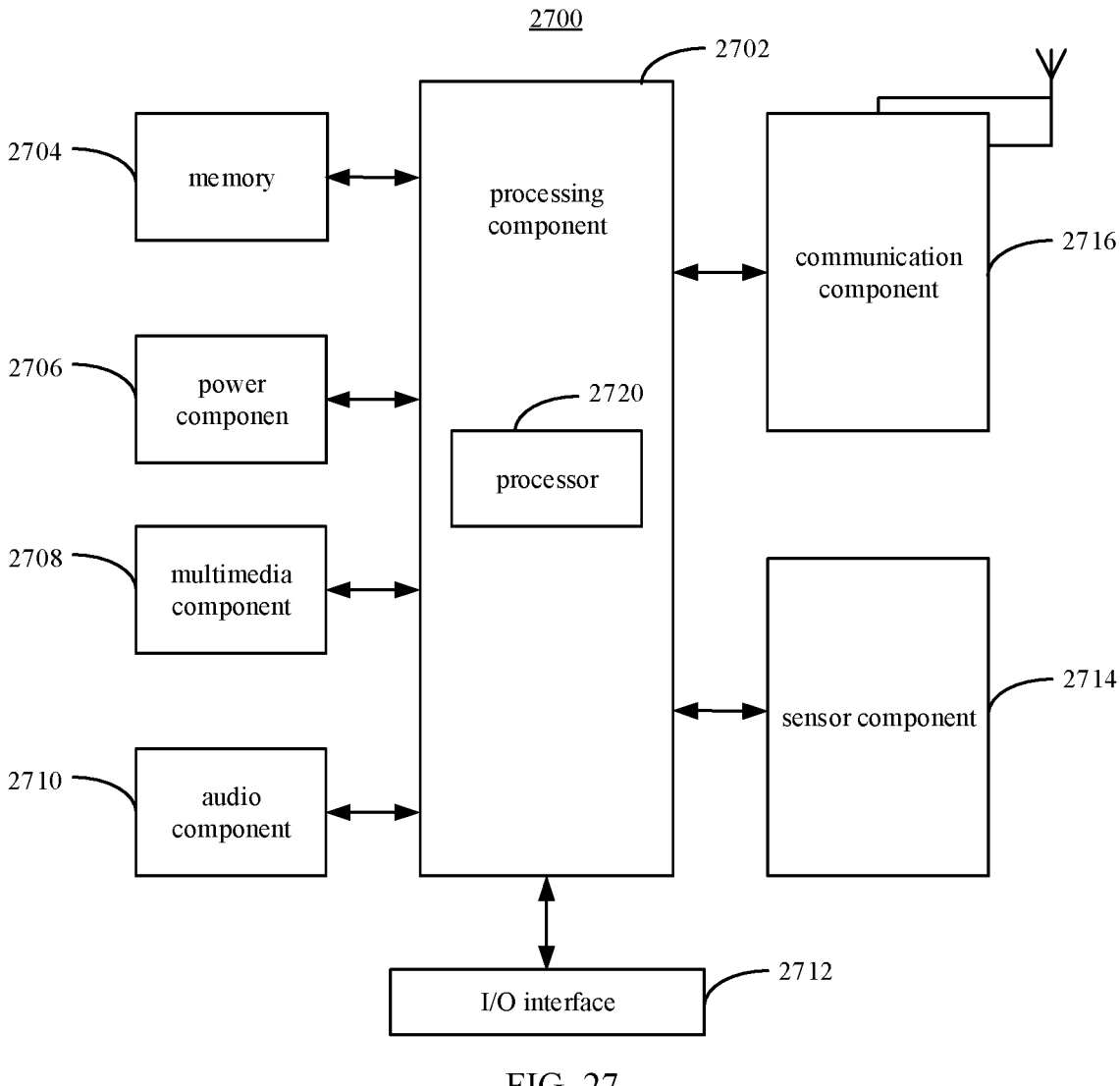

FIG. 27 is a schematic block diagram of a device for indicating a suspension according to some embodiments of the disclosure.

DETAILED DESCRIPTION

The technical solutions in the embodiments of the disclosure will be clearly and completely described below with reference to the accompanying drawings in the embodiments of the disclosure. Obviously, the described embodiments are only a part of the embodiments of the disclosure but not all embodiments. Based on the embodiments in the disclosure, all other embodiments obtained by a person skilled in the art without creative labor shall fall within the protection scope of the disclosure.

For a multi-subscriber-identification-module (multi-SIM) terminal, when the terminal needs to use SIM #2 for communication during a communication process using SIM #1, a communication conflict between SIM #1 and SIM #2 occurs.

In this case, if the terminal chooses to use SIM #2 for communication, a connection between SIM #1 and a base station needs to be disconnected but the base station does not know that SIM #1 is disconnected due to the communication conflict between SIM #1 and SIM #2, which may cause that the base station performs some misoperation in order to re-establish the connection with SIM #2, resulting in a waste of resources.

FIG. 1 is a schematic flowchart of a method for suspending a service according to some embodiments of the disclosure. The method for suspending a service according to some embodiments of the disclosure may be performed by a base station. The base station includes but is not limited to a fourth generation (4G) base station, a fifth generation (5G) base station, and a sixth generation (6G) base station. The base station may communicate with a terminal serving as a user equipment (UE) and may also communicate with a core network. The terminal includes but is not limited to a communication device such as a mobile phone, a tablet computer, a wearable device, a sensor, and an Internet of Things (IoT) device.

In some embodiments, the terminal may be a terminal to which a method for indicating a suspension in any of the subsequent embodiments is applicable. The core network may be a core network to which a method for suspending a service described in any of the subsequent embodiments is applicable.

In some embodiments, multiple SIMs may be provided in the terminal. The SIM includes but is not limited to a universal subscriber identity module (USIM) and an eSIM. Multiple SIMs may belong to the same operator network or different operator networks. The following embodiments describe the case where multiple SIMs include a first SIM and a second SIM. The first SIM and the second SIM do not refer to certain SIMs in the terminal but refer to any two different SIMs in the terminal.

As illustrated in FIG. 1, the method for suspending a service may include the following steps.

In step S101, indication information that a first SIM in a multi-SIM terminal leaves a connected state (in detail, actively leaves the connected state) is received.

In step S102, it is determined to suspend a service corresponding to the first SIM according to a local configuration of the base station.

In some embodiment, if the terminal needs to use the second SIM for communication during the terminal using the first SIM for communication, the problem of communication conflict between the first SIM and the second SIM may occur.

In this case, the terminal may determine whether the first SIM needs to leave the connected state. If it is determined that the first SIM needs to leave the connected state, it may directly send (for example, through an access layer) the indication information to the base station to inform the base station that the first SIM needs to leave the connected state. That is, the base station may directly receive the indication information sent by the first SIM. The terminal may also send the indication information (for example, through a non-access layer) to the core network and the core network sends the indication information to the base station. That is, the base station may receive the indication information sent by the core network, thereby indirectly receiving the indication information from the terminal.

In the related art, it is only applicable to a consumer Internet of Things (CIoT) to suspend user plane services, that is, it only supports to suspend user plane services in the CIoT, while for common terminals and multi-SIM terminals, suspending user plane services is not proposed. For example, for a multi-SIM terminal, after the first SIM leaves the network, since the service corresponding to the first SIM is not suspended, it needs to re-enter the connection state when the first SIM is used continually for communication, which consumes more resources.

The terminal in some embodiments may be a non-CIoT terminal. According to the embodiments of the disclosure, the base station may determine that the first SIM in the terminal needs to leave the connected state according to the indication information and further determine to suspend the service corresponding to the first SIM according to the local configuration of the base station. Therefore, for the common terminal and the multi-SIM terminal, when the SIM in the terminal needs to leave the connection state, the service corresponding to the SIM may be suspended, so that when the first SIM needs to continue for communication, for example, after the second SIM completes communication, it may quickly communicate with the base station to exchange user plane data without re-entering the connected state.

In some embodiments, the first SIM leaves the connected state, which means that the first SIM enters the non-connected state. The type of the non-connected state includes but is not limited to an idle state and an inactive state. The base station may not only determine to suspend the service corresponding to the first SIM according to the local configuration but also consider the type of the non-connected state that the first SIM enters based on this. For example, when the first SIM needs to enter an inactive state and the policy locally configured is able to suspend services, the service corresponding to the first SIM may be suspended; and when the first SIM needs to enter an idle state and the policy locally configured is able to suspend services, the service corresponding to the first SIM is released.

It should be noted that the base station determines to suspend the service corresponding to the first SIM, which includes two cases. One is to determine to suspend and the other is to determine not to suspend. One of ways to determine not to suspend may be to determine to release.

In some embodiments, in the case of determining to suspend, the base station may send a suspension request of suspending the service corresponding to the first SIM to the core network. The core network may suspend the service corresponding to the first SIM according to the local configuration of the core network.

For example, when the core network determines to suspend the service corresponding to the first SIM, it may send a suspension response to the base station to indicate the base station to suspend the service corresponding to the first SIM. The base station may save the context of the service corresponding to the first SIM, send a radio resource control layer (RRC) connection suspension signaling to the terminal for indicating the terminal that the service corresponding to the first SIM is suspended, and further carry a service resume identifier (resume ID) in the signaling, so that the terminal may resume the suspended service based on the service resume ID. The terminal in the non-connected state may resume the suspended service.

In some embodiments, in the case of determining to release, the base station may send a releasing request for releasing the service corresponding to the first SIM to the core network. The core network may release the service corresponding to the first SIM according to the local configuration of the core network.

For example, when the core network determines to release the service corresponding to the first SIM, it may send a release indication to the base station to indicate the base station to release the service corresponding to the first SIM. The base station may delete the context of the service corresponding to the first SIM and send an RRC connection releasing signaling to the terminal for indicating the terminal that the service corresponding to the first SIM is released. If the terminal needs to communicate through the first SIM, it is necessary to re-establish an RRC connection with the base station through the first SIM.

It should be noted that the communication between the base station and the core network may be implemented through the N2 interface between the core network and the base station.

FIG. 2 is a schematic flowchart of another method for suspending a service according to some embodiments of the disclosure. As illustrated in FIG. 2, in some embodiments, determining to suspend the service corresponding to the first SIM according to the local configuration of the base station includes the following steps.

In step S201, a suspension request for suspending the service corresponding to the first SIM is sent to a core network, in response to available resources locally configured in the base station being greater than a first resource threshold.

In step S202, a releasing request for releasing the service corresponding to the first SIM is sent to the core network, in response to the available resources locally configured in the base station being less than the first resource threshold.

In some embodiments, if the service corresponding to the first SIM is suspended, the context of the service needs to be retained, which requires some storage resources. Furthermore, in order to ensure that the terminal in the non-connected state may quickly exchange user plane data with the base station, some resources may be reserved for the terminal for communication, which needs to occupy some time-frequency resources.

In some embodiments, it may be first determined whether the available resources in the local configuration of the base station are sufficient. The available resources include but are not limited to storage resources and time-frequency resources. When the available resources are sufficient, for example, greater than the first resource threshold, it may be determined to suspend the service corresponding to the first SIM and the suspension request for suspending the service corresponding to the first SIM is sent to the core network. When the available resources are insufficient, for example, less than the first resource threshold, it may be determined that the service corresponding to the first SIM is not suspended but the service corresponding to the first SIM is released, and the releasing request for releasing the service corresponding to the first SIM may be sent to the core network.

FIG. 3 is a schematic flowchart of yet another method for suspending a service according to some embodiments of the disclosure. As illustrated in FIG. 3, in some embodiments, determining to suspend the service corresponding to the first SIM according to the local configuration of the base station includes the following steps.

In step S301, a suspension request for suspending the service corresponding to the first SIM is sent to a core network, in response to a policy locally configured in the base station being able to suspend services.

In step S302, a releasing request for releasing the service corresponding to the first SIM is sent to the core network, in response to the policy locally configured in the base station being unable to suspend services.

In some embodiments, policies locally configured in different base stations may be different and policies locally configured in the same base station at different moments may also be different. When the policy locally configured in the base station is able to suspend services, the suspension request for suspending the service corresponding to the first SIM may be sent to the core network. When the policy locally configured in the base station is unable to suspend services, it may be determined that the service corresponding to the first SIM is not suspended but the service corresponding to the first SIM is released, and the releasing request for releasing the service corresponding to the first SIM may be sent to the core network.

FIG. 4 is a schematic flowchart of yet another method for suspending a service according to some embodiments of the disclosure. As illustrated in FIG. 4, in some embodiments, determining to suspend the service corresponding to the first SIM according to the local configuration of the base station includes the following steps.

In step S401, a suspension request for suspending the service corresponding to the first SIM is sent to a core network, in response to available resources locally configured in the base station being greater than a first resource threshold and a policy locally configured in the base station being able to suspend services.

In step S402, a releasing request for releasing the service corresponding to the first SIM is sent to the core network, in response to the available resources locally configured in the base station being less than the first resource threshold or the policy locally configured in the base station being unable to suspend services.

In some embodiments, the local configuration of the base station and the policy locally configured in the base station may be comprehensively considered. For example, when the available resources are sufficient, for example, greater than the first resource threshold, and the policy locally configured in the base station is able to suspend services, it may be determined to suspend the service corresponding to the first SIM and the suspension request for suspending the service corresponding to the first SIM is sent to the core network. When the available resources are insufficient, for example, less than the first resource threshold, or the policy locally configured in the base station is unable to suspend services, it may be determined that the service corresponding to the first SIM is not suspended and the releasing request for releasing the service corresponding to the first SIM may be sent to the core network.

In some embodiments, the first resource threshold may be associated with the indication information sent by the terminal, that is, when the indication information is used to indicate the base station that the first SIM in the terminal leaves the connected state, the base station may use the first resource threshold to compare with the available resources to determine whether to suspend the service corresponding to the first SIM. When the indication information is used to indicate other content (for example, the first SIM is in shadow fading), the base station may determine whether to suspend the service corresponding to the first SIM in other ways.

FIG. 5 is a schematic flowchart of yet another method for suspending a service according to some embodiments of the disclosure. As illustrated in FIG. 5, in some embodiments, the method further includes the following step.

In step S501, a suspension request for suspending the service corresponding to the first SIM is sent to a core network, in which the suspension request includes a reason of suspending the service corresponding to the first SIM being that the multi-SIM terminal leaves.

In the related art, although the base station may send a suspension request for a certain service to the core network, it generally only indicates rough operation type information as user plane suspension. The reason of suspending the service of the first SIM is not accurately determined by the core network based on this information.

According to some embodiments, the base station may carry the reason of suspending the service corresponding to the first SIM in the suspension request that is sent to the core network, for example, the reason is carried in the operation type information, so that the core network may determine the reason that the base station requests to suspend the service corresponding to the first SIM is the first SIM leaves the connected state. Therefore, the core network may accurately determine whether to suspend the service corresponding to the first SIM according to the reason.

It should be noted that, in all embodiments of the disclosure, the reason is that the multi-SIM terminal leaves, and the specific reason may be, for example, that the first SIM in the multi-SIM terminal leaves the connection state.

FIG. 6 is a schematic flowchart of yet another method for suspending a service according to some embodiments of the disclosure. As illustrated in FIG. 6, in some embodiments, the method further includes the following steps.

In step S601, a duration in which the first SIM leaves the connected state is determined.

In step S602, the duration is sent to the core network.

In some embodiments, when the terminal determines that the first SIM needs to leave the connected state, it may predict the duration in which the first SIM needs to leave the connected state. For example, the terminal may determine a duration in which the second SIM needs to communicate and determine the duration in which the first SIM leaves the connected state according to this duration in which the second SIM needs to communicate (for example, this duration in which the second SIM needs to communicate or this duration in which the second SIM needs to communicate plus another duration as the duration in which the first SIM leaves the connected state) and further send the predicted duration to the base station. The base station may further send the predicted duration to the core network so that the core network may determine the moment of releasing the service corresponding to the first SIM according to the predicted duration. For example, the core network may release the service corresponding to the first SIM when the period of suspending the service corresponding to the first SIM card reaches the predicted duration.

FIG. 7 is a schematic flowchart of a method for suspending a service according to some embodiments of the disclosure. The method for suspending a service according to some embodiments of the disclosure may be performed by a core network. The core network includes but is not limited to a 4G core network, a 5G core network, and a 6G core network. The core network may communicate with a terminal serving as a UE and may also communicate with a base station. The terminal includes but is not limited to a communication device such as a mobile phone, a tablet computer, a wearable device, a sensor, and an IoT device.

In some embodiments, the terminal may be a terminal to which a method for indicating a suspension in any of the subsequent embodiments is applicable. The base station may be a base station to which a method for suspending a service described in any of the foregoing embodiments is applicable.

As illustrated in FIG. 7, the method for suspending a service may include the following steps.

In step S701, a suspension request for suspending a service corresponding to a first SIM in a multi-SIM terminal is received from a base station, in which the suspension request includes a reason of suspending the service corresponding to the first SIM being that the multi-SIM terminal leaves.

In step S702, it is determined to suspend the service corresponding to the first SIM according to the reason and a local configuration of the core network.

In the related art, although the base station may send a suspension request for a certain service to the core network, it generally only indicates rough operation type information as user plane suspension. The reason of suspending the service of the first SIM is not accurately determined by the core network based on this information.

According to some embodiments, the base station may carry the reason of suspending the service corresponding to the first SIM in the suspension request that is sent to the core network, for example, the reason is carried in the operation type information, so that the core network may determine the reason that the base station requests to suspend the service corresponding to the first SIM is the first SIM leaves the connected state. Therefore, the core network may accurately determine whether to suspend the service corresponding to the first SIM according to the reason and the local configuration of the core network.

FIG. 8 is a schematic flowchart of another method for suspending a service according to some embodiments of the disclosure. As illustrated in FIG. 8, in some embodiments, determining to suspend the service corresponding to the first SIM according to the reason and the local configuration of the core network includes the following steps.

In step S801, the service corresponding to the first SIM is suspended, in response to available resources locally configured in the core network being greater than a second resource threshold, in which the second resource threshold is associated with the reason.

In step S802, the service corresponding to the first SIM is released, in response to the available resources locally configured in the core network being less than the second resource threshold.

In some embodiments, the second resource threshold may be associated with the reason, that is, when the reason is that the multi-SIM terminal leaves, the core network compares the second resource threshold with the available resources to determine whether to suspend the service corresponding to the first SIM. When the reason is other reasons (for example, the first SIM is in shadow fading) or when there is no such reason in the suspension request, the core network may determine whether to suspend the service corresponding to the first SIM in other ways.

In some embodiments, if the service corresponding to the first SIM is suspended, the context of the service needs to be retained, which requires some storage resources. Furthermore, in order to ensure that the terminal in the non-connected state may quickly exchange user plane data with the core network, some resources may be reserved for the terminal for communication, which needs to occupy some time-frequency resources.

In some embodiments, it may be first determined whether the available resources in the local configuration of the core network are sufficient. The available resources include but are not limited to storage resources and time-frequency resources. When the available resources are sufficient, for example, greater than the second resource threshold, it may be determined to suspend the service corresponding to the first SIM. When the available resources are insufficient, for example, less than the second resource threshold, it may be determined not to suspend the service corresponding to the first SIM, but release the service corresponding to the first SIM, and delete the context of the service corresponding to the first SIM.

FIG. 9 is a schematic flowchart of yet another method for suspending a service according to some embodiments of the disclosure. As illustrated in FIG. 9, in some embodiments, determining to suspend the service corresponding to the first SIM according to the reason and the local configuration of the core network includes the following steps.

In step S901, the service corresponding to the first SIM is suspended, in response to a policy locally configured in the core network being able to suspend services.

In step S902, the service corresponding to the first SIM is released, in response to the policy locally configured in the core network being unable to suspend services.

In some embodiments, policies locally configured in different core networks may be different and policies locally configured in the same core network at different moments may also be different. When the policy locally configured in the core network is able to suspend services, the service corresponding to the first SIM may be suspended. When the policy locally configured in the core network is unable to suspend services, the service corresponding to the first SIM may not be suspended, the service corresponding to the first SIM is released, and the context of the service corresponding to the first SIM is deleted.

FIG. 10 is a schematic flowchart of yet another method for suspending a service according to some embodiments of the disclosure. As illustrated in FIG. 10, in some embodiments, determining to suspend the service corresponding to the first SIM according to the reason and the local configuration of the core network includes the following steps.

In step S1001, the service corresponding to the first SIM is suspended, in response to available resources locally configured in the core network being greater than a second resource threshold and a policy locally configured in the core network being able to suspend services, in which the second resource threshold is associated with the reason.

In step S1002, the service corresponding to the first SIM is released, in response to the available resources locally configured in the core network being less than the second resource threshold or the policy locally configured in the core network being unable to suspend services.

In some embodiments, the local configuration of the core network and the policy locally configured in the core network may be comprehensively considered. For example, when the available resources are sufficient, for example, greater than the second resource threshold and the policy configured locally in the core network is able to suspend services, the service corresponding to the first SIM may be suspended. When the available resources are insufficient, for example, less than second resource threshold or the policy configured locally in the core network is unable to suspend services, the service corresponding to the first SIM may not be suspended, the service corresponding to the first SIM may be released, and the context of the service corresponding to the first SIM is deleted.

FIG. 11 is a schematic flowchart of yet another method for suspending a service according to some embodiments of the disclosure. As illustrated in FIG. 11, in some embodiments, the core network includes an AMF and an SMF. The method further includes the following steps.

In step S1101, an updating request for updating session management context of the service corresponding to the first SIM is sent to the SMF by the AMF, in which the updating request includes an operation type being a user plane suspension and a reason of the user plane suspension being the multi-SIM terminal leaves.

In step S1102, the session management context of the service corresponding to the first SIM is updated by the SMF, in response to the reason for the user plane suspension being that the multi-SIM terminal leaves.

In some embodiments, when the core network determines to suspend the first SIM, it may send an updating request to the SMF by the AMF and the updating request may include the operation type being the user plane suspension, that is, the specific reason of the user plane suspension is that the first SIM leaves the connected state, the SMF may appropriately update the session management context of the service corresponding to the first SIM according to the reason.

Further, the SMF may also send an N4 session modification request to the user plane function (UPF) and indicate through the session modification request whether the UPF suspends the service corresponding to the first SIM. If suspend, the UPF may not release AN tunnel (communication tunnel of the base station and the core network) information and cache the context of the service corresponding to the first SIM. If release, UPF may release the AN tunnel (communication tunnel of the base station and the core network) information and delete the context of the service corresponding to the first SIM.

FIG. 12 is a schematic flowchart of yet another method for suspending a service according to some embodiments of the disclosure. As illustrated in FIG. 12, in some embodiments, the method further includes the following steps.

In step S1201, a duration in which the first SIM leaves the connected state is determined.

In step S1202, the service corresponding to the first SIM is released in response to a period of suspending the service corresponding to the first SIM reaching the duration.

In some embodiments, when the terminal determines that the first SIM needs to leave the connected state, it may predict the duration in which the first SIM needs to leave the connected state. For example, the terminal may determine a duration in which the second SIM needs to communicate and determine the duration in which the first SIM leaves the connected state according to this duration in which the second SIM needs to communicate (for example, this duration in which the second SIM needs to communicate or this duration in which the second SIM needs to communicate plus another duration as the duration in which the first SIM leaves the connected state) and further send the predicted duration to the base station. The base station may further send the predicted duration to the core network so that the core network may determine the moment of releasing the service corresponding to the first SIM according to the predicted duration. For example, the core network may release the service corresponding to the first SIM when the period of suspending the service corresponding to the first SIM card reaches the predicted duration.

For example, the core network may release the service corresponding to the first SIM when the period of suspending the service corresponding to the first SIM reaches the duration. Since the period of suspending the service corresponding to the first SIM reaches the duration, the first SIM is no longer in a state of leaving the connected state. For example, it has returned to the connected state through random access. The context of the service corresponding to the first SIM is no longer the context saved by the core network when the first SIM leaves the connected state. Continuing to save this context may cause a waste of storage resources, the service corresponding to the first SIM may be released, that is, the context of the service corresponding to the first SIM when the first SIM leaves the connected state is deleted.

FIG. 13 is a schematic flowchart of a method for indicating a suspension according to some embodiments of the disclosure. The method for indicating a suspension according to some embodiments of the disclosure may be performed by a terminal. The terminal includes but is not limited to a communication device such as a mobile phone, a tablet computer, a wearable device, a sensor, and an IoT device. The terminal as a UE may communicate with a base station. The base station includes but is not limited to a 4G base station, a 5G base station, and a 6G base station.

In some embodiments, the base station may be a base station to which a method for suspending a service described in any of the foregoing embodiments is applicable. The core network may be a core network to which a method for suspending a service described in any of the foregoing embodiments is applicable.

In some embodiments, multiple SIMs may be provided in the terminal. The SIM includes but is not limited to a USIM and an eSIM. Multiple SIMs may belong to the same operator network or different operator networks. The following embodiments describe the case where multiple SIMs include a first SIM and a second SIM. The first SIM and the second SIM do not refer to certain SIMs in the terminal but refer to any two different SIMs in the terminal.

As illustrated in FIG. 13, the method for indicating a suspension may include the following step.

In step S1301, indication information is sent to a base station and/or a core network in response to a requirement that a first SIM in a terminal leaves a connected state, to enable the base station to determine to suspend a service corresponding to the first SIM according to a local configuration of the base station, and/or to enable the core network to determine to suspend the service corresponding to the first SIM according to a reason of the service corresponding to the first SIM and a local configuration of the core network.

The indication information is configured to indicate that the first SIM leaves the connected state.

According to the embodiments of the disclosure, when the first SIM needs to leave the connected state, the terminal may send the indication information to the base station. The base station may determine according to the indication information that the first SIM in the terminal needs to leave the connected state and determine to suspend the service corresponding to the first SIM according to the local configuration of the base station. Therefore, for the common terminal and the multi-SIM terminal, when the SIM in the terminal needs to leave the connection state, the service corresponding to the SIM may be suspended, so that when the first SIM needs to continue for communication, for example, after the second SIM completes communication, it may quickly communicate with the base station to exchange user plane data without re-entering the connected state.

The terminal may also send the indication information to the core network and the base station may also send a suspension request to the core network after receiving the indication information, so that the core network may determine the reason that the base station requests to suspend the service corresponding to the first SIM being the first SIM leaves the connected state and the core network may accurately determine whether to suspend the service corresponding to the first SIM according to the reason and the local configuration of the core network.

FIG. 14 is a schematic flowchart of another method for indicating a suspension according to some embodiments of the disclosure. As illustrated in FIG. 14, in some embodiments, the method further includes the following step.

In step S1401, it is determined that the first SIM leaves the connected state (actively leaves the connected state), in response to a second SIM being required for communication when the first SIM in the terminal is in the connected state.

In some embodiments, in the process of using the first SIM for communication, if the terminal needs to use the second SIM for communication, there may be a communication conflict between the first SIM and the second SIM. In this case, the terminal may determine that the first SIM needs to leave the connected state.

FIG. 15 is a schematic flowchart of another method for indicating a suspension according to some embodiments of the disclosure. As illustrated in FIG. 15, in some embodiments, the method further includes the following steps.

In step S1501, a duration in which the first SIM leaves the connected state is predicted.

In step S1502, the duration is sent to the base station and/or the core network.

In some embodiments, when the terminal determines that the first SIM needs to leave the connected state, it may predict the duration in which the first SIM needs to leave the connected state. For example, the terminal may determine a duration in which the second SIM needs to communicate and determine the duration in which the first SIM leaves the connected state according to this duration in which the second SIM needs to communicate (for example, this duration in which the second SIM needs to communicate or this duration in which the second SIM needs to communicate plus another duration as the duration in which the first SIM leaves the connected state) and further send the predicted duration to the base station. The base station may further send the predicted duration to the core network so that the core network may determine the moment of releasing the service corresponding to the first SIM according to the predicted duration. For example, the core network may release the service corresponding to the first SIM when the period of suspending the service corresponding to the first SIM card reaches the predicted duration.

FIG. 16 is a schematic diagram of interaction between a base station and a core network according to some embodiments of the disclosure.

As illustrated in FIG. 16, after receiving the indication information that the first SIM leaves the connected state from the terminal, the base station may determine to suspend the service corresponding to the first SIM according to the local configuration of the base station.

If it is determined to suspend the service corresponding to the first SIM, a suspension request may be sent to the AMF of the core network and the reason of suspending the service corresponding to the first SIM, carried in the suspension request, is that the first SIM leaves the connected state. The duration in which the first SIM leaves the connected state may be further carried in the suspension request.

The AMF of the core network may send an updating request for updating the session management context of the service corresponding to the first SIM to the SMF of the core network and the updating request may carry the operation type being the user plane suspension and the reason of the user plane suspension being the multi-SIM terminal leaves, and may further carry the duration in which the first SIM leaves the connected state.

The SMF of the core network may determine whether to release the service corresponding to the first SIM and accordingly indicate the UPF of the core network whether to release the AN tunnel and whether to cache the context of the service corresponding to the first SIM.

After updating the session management context of the service corresponding to the first SIM, the SMF may return a context updating response to the AMF.

The AMF may send a response of the suspension request to the base station.

The base station may send the RRC connection suspension signaling and the service resume identifier to the terminal.

Corresponding to the foregoing embodiments of the method for suspending a service and the method for indicating a suspension, the disclosure also provides embodiments of an apparatus for suspending a service and an apparatus for indicating a suspension.

FIG. 17 is a schematic block diagram of an apparatus for suspending a service according to some embodiments of the disclosure. The apparatus for suspending a service according to some embodiments of the disclosure may be implemented in a base station. The base station includes but is not limited to a 4G base station, a 5G base station, and a 6G base station. The base station may communicate with a terminal serving as a UE and may also communicate with a core network. The terminal includes but is not limited to a communication device such as a mobile phone, a tablet computer, a wearable device, a sensor, and an IoT device.

In some embodiments, multiple SIMs may be provided in the terminal. The SIM includes but is not limited to a USIM and an eSIM. Multiple SIMs may belong to the same operator network or different operator networks. The following embodiments describe the case where multiple SIMs include a first SIM and a second SIM. The first SIM and the second SIM do not refer to certain SIMs in the terminal but refer to any two different SIMs in the terminal.

As illustrated in FIG. 17, the apparatus for suspending a service may include an indication receiving module 1701 and a suspension determining module 1702.

The indication receiving module 1701 is configured to receive indication information that a first SIM in a multi-SIM terminal leaves a connected state.

The suspension determining module 1702 is configured to determine to suspend a service corresponding to the first SIM according to a local configuration of the base station.

In some embodiments, the indication receiving module is configured to receive the indication information from the first SIM or receive the indication information from a core network.

In some embodiments, the suspension determining module is configured to send a suspension request for suspending the service corresponding to the first SIM to a core network, in response to available resources locally configured in the base station being greater than a first resource threshold; and send a releasing request for releasing the service corresponding to the first SIM to the core network, in response to the available resources locally configured in the base station being less than the first resource threshold.

In some embodiments, the suspension determining module is configured to send a suspension request for suspending the service corresponding to the first SIM to a core network, in response to a policy locally configured in the base station being able to suspend services; and send a releasing request for releasing the service corresponding to the first SIM to the core network, in response to the policy locally configured in the base station being unable to suspend services.

In some embodiments, the suspension determining module is configured to send a suspension request for suspending the service corresponding to the first SIM to a core network, in response to available resources locally configured in the base station being greater than a first resource threshold and a policy locally configured in the base station being able to suspend services; and send a releasing request for releasing the service corresponding to the first SIM to the core network, in response to the available resources locally configured in the base station being less than the first resource threshold or the policy locally configured in the base station being unable to suspend services FIG. 18 is a schematic block diagram of another apparatus for suspending a service according to some embodiments of the disclosure. As illustrated in FIG. 18, the apparatus further includes a suspension requesting module 1801.

The suspension requesting module 1801 is configured to send a suspension request for suspending the service corresponding to the first SIM to a core network, in which the suspension request includes a reason of suspending the service corresponding to the first SIM being that the multi-SIM terminal leaves.

FIG. 19 is a schematic block diagram of yet another apparatus for suspending a service according to some embodiments of the disclosure. As illustrated in FIG. 19, the apparatus further includes a duration determining module 1901 and a duration sending module 1902.

The duration determining module 1901 is configured to determine a duration in which the first SIM leaves the connected state.

The duration sending module 1902 is configured to send the duration to the core network.

FIG. 20 is a schematic block diagram of an apparatus for suspending a service according to some embodiments of the disclosure. The apparatus for suspending a service according to some embodiments of the disclosure may be implemented in a core network. The core network includes but is not limited to a 4G core network, a 5G core network, and a 6G core network. The core network may communicate with a terminal serving as a UE and may also communicate with a base station. The terminal includes but is not limited to a communication device such as a mobile phone, a tablet computer, a wearable device, a sensor, and an IoT device.

As illustrated in FIG. 20, the apparatus for suspending a service may include a request receiving module 2001 and a suspension determining module 2002.

The request receiving module 2001 is configured to receive a suspension request for suspending a service corresponding to a first SIM in a multi-SIM terminal from a base station, in which the suspension request includes a reason of suspending the service corresponding to the first SIM being that the multi-SIM terminal leaves.

The suspension determining module 2002 is configured to determine to suspend the service corresponding to the first SIM according to the reason and a local configuration of the core network.

In some embodiments, the suspension determining module is configured to suspend the service corresponding to the first SIM, in response to available resources locally configured in the core network being greater than a second resource threshold, in which the second resource threshold is associated with the reason; and release the service corresponding to the first SIM, in response to the available resources locally configured in the core network being less than the second resource threshold.

In some embodiments, the suspension determining module is configured to suspend the service corresponding to the first SIM, in response to a policy locally configured in the core network being able to suspend services; and release the service corresponding to the first SIM, in response to the policy locally configured in the core network being unable to suspend services.

In some embodiments, the suspension determining module is configured to suspend the service corresponding to the first SIM, in response to available resources locally configured in the core network being greater than a second resource threshold and a policy locally configured in the core network being able to suspend services, in which the second resource threshold is associated with the reason; and release the service corresponding to the first SIM, in response to the available resources locally configured in the core network being less than the second resource threshold or the policy locally configured in the core network being unable to suspend services.

FIG. 21 is a schematic block diagram of another apparatus for suspending a service according to some embodiments of the disclosure. As illustrated in FIG. 21, the core network includes an AMF and an SMF. The apparatus further includes an update requesting module 2101 and a context updating module 2102.

The update requesting module 2101 is configured to send by the AMF, an updating request for updating session management context of the service corresponding to the first SIM to the SMF, in which the updating request includes an operation type being a user plane suspension and a reason of the user plane suspension being the multi-SIM terminal leaves.

The context updating module 2102 is configured to update the session management context of the service corresponding to the first SIM by the SMF, in response to the reason for the user plane suspension being that the multi-SIM terminal leaves.

FIG. 22 is a schematic block diagram of yet another apparatus for suspending a service according to some embodiments of the disclosure. As illustrated in FIG. 22, in some embodiments, the apparatus further includes a duration determining module 2201 and a service releasing module 2202.

The duration determining module 2201 is configured to determine a duration in which the first SIM leaves the connected state.

The service releasing module 2202 is configured to release the service corresponding to the first SIM, in response to a period of suspending the service corresponding to the first SIM reaching the duration.

FIG. 23 is a schematic block diagram of an apparatus for indicating a suspension according to some embodiments of the disclosure. The apparatus for indicating a suspension according to some embodiments of the disclosure may be implemented in a terminal. The terminal includes but is not limited to a communication device such as a mobile phone, a tablet computer, a wearable device, a sensor, and an IoT device. The terminal as a UE may communicate with a base station. The base station includes but is not limited to a 4G base station, a 5G base station, and a 6G base station.

In some embodiments, multiple SIMs may be provided in the terminal. The SIM includes but is not limited to a USIM and an eSIM. Multiple SIMs may belong to the same operator network or different operator networks. The following embodiments describe the case where multiple SIMs include a first SIM and a second SIM. The first SIM and the second SIM do not refer to certain SIMs in the terminal but refer to any two different SIMs in the terminal.

As illustrated in FIG. 23, the apparatus for indicating a suspension may include an instruction sending module 2301.

The indication sending module 2301 is configured to send indication information to a base station and/or a core network in response to a requirement that a first SIM in a terminal leaves a connected state, to enable the base station to determine to suspend a service corresponding to the first SIM according to a local configuration of the base station, and/or to enable the core network to determine to suspend the service corresponding to the first SIM according to a reason of the service corresponding to the first SIM and a local configuration of the core network.

The indication information is configured to indicate that the first SIM leaves the connected state.

FIG. 24 is a schematic block diagram of another apparatus for indicating a suspension according to some embodiments of the disclosure. As illustrated in FIG. 24, the apparatus further includes a leaving determining module 2401.

The leaving determining module 2401 is configured to determine that the first SIM leaves the connected state, in response to a second SIM being required for communication when the first SIM in the terminal is in the connected state.

FIG. 25 is a schematic block diagram of another apparatus for indicating a suspension according to some embodiments of the disclosure. As illustrated in FIG. 25, in some embodiments, the apparatus further includes a duration predicting module 2501 and a duration sending module 2502.

The duration predicting module 2501 is configured to predict a duration in which the first SIM leaves the connected state.

The duration sending module 2502 is configured to send the duration to the base station and/or the core network.

With respect to the apparatuses in the above embodiments, the specific manners for performing operations for individual modules therein have been described in detail in the embodiments regarding the related methods, which will not be elaborated herein.

The apparatus embodiments refer to part descriptions of the method embodiments since they correspond to the method embodiments. The apparatus embodiments described above are only schematic, in which the above units described as separate parts may or may not be physically separated, and the parts shown as units may or may not be physical units, which may be located in one place, or may be distributed to multiple network units. Some or all modules may be selected according to the actual requirements to achieve the purpose of the disclosure. A person skilled in the art may understand and implement it without any creative effort.

Embodiments of the disclosure also provide a communication device, including:

a processor; and a memory for storing computer programs;

When the computer programs are executed by the processor, the method for suspending a service described in any of the foregoing embodiments, performed by the base station, is performed.

Embodiments of the disclosure also provide a communication device, including:

a processor; and a memory for storing computer programs;

When the computer programs are executed by the processor, the method for suspending a service described in any of the foregoing embodiments, performed by the core network, is performed.

Embodiments of the disclosure also provide a communication device, including:

a processor; and a memory for storing computer programs;

When the computer programs are executed by the processor, the method for indicating a suspension described in any of the foregoing embodiments, performed by the terminal, is performed.

Embodiments of the disclosure further provide a computer-readable storage medium for storing computer programs, and when the computer programs are executed by a processor, steps in the method for suspending a service described in any of the foregoing embodiments, performed by the base station, are performed.

Embodiments of the disclosure further provide a computer-readable storage medium for storing computer programs, and when the computer programs are executed by a processor, steps in the method for suspending a service described in any of the foregoing embodiments, performed by the core network, are performed.

Embodiments of the disclosure further provide a computer-readable storage medium for storing computer programs, and when the computer programs are executed by a processor, steps in the method for indicating a suspension described in any of the foregoing embodiments, performed by the terminal, are performed.

As illustrated in FIG. 26, FIG. 26 is a schematic block diagram of a device 2600 for suspending a service according to some embodiments of the disclosure. The device 2600 may be provided as a base station. Reference to FIG. 26, the device 2600 includes a processing component 2622, a wireless transmitting/receiving component 2624, an antenna component 2626, and a signal processing portion specific to wireless interfaces. The processing component 2622 may further include one or more processors. One of the processors in the processing component 2622 may be configured to perform the method for suspending a service, performed by a base station, described in any of the foregoing embodiments.

FIG. 27 is a schematic block diagram of a device 2700 for indicating a suspension according to some embodiments of the disclosure. For example, the device 2700 may be a mobile phone, a computer, a digital broadcast terminal, a messaging device, a gaming console, a tablet, a medical device, exercise equipment, a personal digital assistant, and the like.

Referring to FIG. 27, the device 2700 may include one or more of the following components: a processing component 2702, a memory 2704, a power component 2706, a multimedia component 2708, an audio component 2710, an input/output (I/O) interface 2712, a sensor component 2714, and a communication component 2716.

The processing component 2702 typically controls overall operations of the device 2700, such as the operations associated with display, telephone calls, data communications, camera operations, and recording operations. The processing component 2702 may include one or more processors 2720 to execute instructions to perform all or part of the steps in the above described methods for indicating a suspension. Moreover, the processing component 2702 may include one or more modules which facilitate the interaction between the processing component 2702 and other components. For instance, the processing component 2702 may include a multimedia module to facilitate the interaction between the multimedia component 2708 and the processing component 2702.

The memory 2704 is configured to store various types of data to support the operation of the device 2700. Examples of such data include instructions for any applications or methods operated on the device 2700, contact data, phonebook data, messages, pictures, video, etc. The memory 2704 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2706 provides power to various components of the device 2700. The power component 2706 may include a power management system, one or more power sources, and any other components associated with the generation, management, and distribution of power in the device 2700.

The multimedia component 2708 includes a screen providing an output interface between the device 2700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2708 includes a front camera and/or a rear camera. The front camera and the rear camera may receive an external multimedia datum while the device 2700 is in an operation mode, such as a photographing mode or a video mode. Each of the front camera and the rear camera may be a fixed optical lens system or have focus and optical zoom capability.

The audio component 2710 is configured to output and/or input audio signals. For example, the audio component 2710 includes a microphone ("MIC") configured to receive an external audio signal when the device 2700 is in an operation mode, such as a call mode, a recording mode, and a voice recognition mode. The received audio signal may be further stored in the memory 2704 or transmitted via the communication component 2716. In some embodiments, the audio component 2710 further includes a speaker to output audio signals.

The I/O interface 2712 provides an interface between the processing component 2702 and peripheral interface modules, such as a keyboard, a click wheel, buttons, and the like. The buttons may include, but are not limited to, a home button, a volume button, a starting button, and a locking button.

The sensor component 2714 includes one or more sensors to provide status assessments of various aspects of the device 2700. For instance, the sensor component 2714 may detect an open/closed status of the device 2700, relative positioning of components, e.g., the display and the keypad, of the device 2700, a change in position of the device 2700 or a component of the device 2700, a presence or absence of user contact with the device 2700, an orientation or an acceleration/deceleration of the device 2700, and a change in temperature of the device 2700. The sensor component 2714 may include a proximity sensor configured to detect the presence of nearby objects without any physical contact. The sensor component 2714 may also include a light sensor, such as a CMOS or CCD image sensor, for use in imaging applications. In some embodiments, the sensor component 2714 may also include an accelerometer sensor, a gyroscope sensor, a magnetic sensor, a pressure sensor, or a temperature sensor.

The communication component 2716 is configured to facilitate communication, wired or wirelessly, between the device 2700 and other devices. The device 2700 may access a wireless network based on a communication standard, such as Wi-Fi, second generation (2G) or third generation (3G), fourth generation (4G) Long Term Evolution (LTE), fifth generation (5G) new radio (NR), or a combination thereof. In one exemplary embodiment, the communication component 2716 receives a broadcast signal or broadcast associated information from an external broadcast management system via a broadcast channel. In one exemplary embodiment, the communication component 2716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 2700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 2704, executable by the processor 2720 in the device 2700, for performing the above-described methods for indicating a suspension. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed herein. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims It should be noted that, in the disclosure, relational terms such as first and second are used only to distinguish one entity or operation from another entity or operation, and do not necessarily require or imply any such actual relationship or sequence exists between these entities or operations. The terms "comprising", "including" or any other variation thereof are intended to encompass non-exclusive inclusion such that a process, method, article, or device including a list of elements includes not only those elements, but also other elements not expressly listed, or also include elements inherent to such the process, method, article, or device. Without further limitation, an element qualified by the phrase "including a . . . " does not preclude the presence of additional identical elements in the process, method, article, or device that includes the element.

The methods and apparatuses or devices provided by embodiments of the disclosure have been described in detail above, and specific examples are used to illustrate the principles and implementations of the disclosure. At the same time, for those skilled in the art, according to the idea of the disclosure, there will be changes in the specific implementation and application scope. In summary, the content of this specification should not be construed as limiting the disclosure.

According to a first aspect of embodiments of the disclosure, a method for suspending a service is provided. The method is performed by a base station. The method includes: receiving indication information that a first SIM in a multi-SIM terminal leaves a connected state; and determining to suspend a service corresponding to the first SIM according to a local configuration of the base station.

In some embodiments, receiving the indication information that the first SIM in the multi-SIM terminal leaves the connected state comprises: receiving the indication information from the first SIM; or receiving the indication information from a core network.

In some embodiments, determining to suspend the service corresponding to the first SIM according to the local configuration of the base station comprises: sending a suspension request for suspending the service corresponding to the first SIM to a core network, in response to available resources locally configured in the base station being greater than a first resource threshold; and sending a releasing request for releasing the service corresponding to the first SIM to the core network, in response to the available resources locally configured in the base station being less than the first resource threshold.

In some embodiments, determining to suspend the service corresponding to the first SIM according to the local configuration of the base station comprises: sending a suspension request for suspending the service corresponding to the first SIM to a core network, in response to a policy locally configured in the base station being able to suspend services; and sending a releasing request for releasing the service corresponding to the first SIM to the core network, in response to the policy locally configured in the base station being unable to suspend services.

In some embodiments, determining to suspend the service corresponding to the first SIM according to the local configuration of the base station comprises: sending a suspension request for suspending the service corresponding to the first SIM to a core network, in response to available resources locally configured in the base station being greater than a first resource threshold and a policy locally configured in the base station being able to suspend services.

In some embodiments, the method further comprises: sending a suspension request for suspending the service corresponding to the first SIM to a core network, wherein the suspension request comprises a reason of suspending the service corresponding to the first SIM being that the multi-SIM terminal leaves.

In some embodiments, the method further comprises: determining a duration in which the first SIM leaves the connected state; and sending the duration to the core network.

According to a second aspect of embodiments of the disclosure, a method for suspending a service is provided. The method is performed by a core network. The method includes: receiving a suspension request for suspending a service corresponding to a first SIM in a multi-SIM terminal from a base station, in which the suspension request includes a reason of suspending the service corresponding to the first SIM being that the multi-SIM terminal leaves; and determining to suspend the service corresponding to the first SIM according to the reason and a local configuration of the core network.

In some embodiments, determining to suspend the service corresponding to the first SIM according to the reason and the local configuration of the core network comprises: suspending the service corresponding to the first SIM, in response to available resources locally configured in the core network being greater than a second resource threshold, wherein the second resource threshold is associated with the reason; and releasing the service corresponding to the first SIM, in response to the available resources locally configured in the core network being less than the second resource threshold.

In some embodiments, determining to suspend the service corresponding to the first SIM according to the reason and the local configuration of the core network comprises: suspending the service corresponding to the first SIM, in response to a policy locally configured in the core network being able to suspend services; and releasing the service corresponding to the first SIM in response to the policy locally configured in the core network being unable to suspend services.

In some embodiments, determining to suspend the service corresponding to the first SIM according to the reason and the local configuration of the core network comprises: suspending the service corresponding to the first SIM, in response to available resources locally configured in the core network being greater than a second resource threshold and a policy locally configured in the core network being able to suspend services, wherein the second resource threshold is associated with the reason.

In some embodiments, the core network comprises an access and mobility management function (AMF) and a session management function (SMF), and the method further comprises: sending by the AMF, an updating request for updating session management context of the service corresponding to the first SIM to the SMF, wherein the updating request comprises an operation type being a user plane suspension and a reason of the user plane suspension being the multi-SIM terminal leaves; updating the session management context of the service corresponding to the first SIM by the SMF, in response to the reason for the user plane suspension being that the multi-SIM terminal leaves.

In some embodiments, the method further comprises: determining a duration in which the first SIM leaves the connected state; and releasing the service corresponding to the first SIM, in response to a period of suspending the service corresponding to the first SIM reaching the duration.

According to a third aspect of embodiments of the disclosure, a method for indicating a suspension is provided. The method is performed by a terminal. The method includes: sending indication information to a base station and/or a core network in response to a requirement that a first SIM in a terminal leaves a connected state, to enable the base station to determine to suspend a service corresponding to the first SIM according to a local configuration of the base station, and/or to enable the core network to determine to suspend the service corresponding to the first SIM according to a reason of the service corresponding to the first SIM and a local configuration of the core network; the indication information is configured to indicate that the first SIM leaves the connected state.

In some embodiments, the method further comprises: determining that the first SIM leaves the connected state, in response to a second SIM being required for communication when the first SIM in the terminal is in the connected state.

In some embodiments, the method further comprises: predicting a duration in which the first SIM leaves the connected state; and sending the duration to the base station and/or the core network.

According to a fourth aspect of embodiments of the disclosure, an apparatus for suspending a service is provided. The apparatus is implemented in a base station. The apparatus includes: an indication receiving module, configured to receive indication information that a first SIM in a multi-SIM terminal leaves a connected state; and a suspension determining module, configured to determine to suspend a service corresponding to the first SIM according to a local configuration of the base station.

According to a fifth aspect of embodiments of the disclosure, an apparatus for suspending a service is provided. The apparatus is implemented in a core network. The apparatus includes: a request receiving module, configured to receive a suspension request for suspending a service corresponding to a first SIM in a multi-SIM terminal from a base station, in which the suspension request includes a reason of suspending the service corresponding to the first SIM being that the multi-SIM terminal leaves; and a suspension determining module, configured to determine to suspend the service corresponding to the first SIM according to the reason and a local configuration of the core network.

According to a sixth aspect of embodiments of the disclosure, an apparatus for indicating a suspension is provided. The apparatus is implemented in a terminal. The apparatus includes: an indication sending module, configured to send indication information to a base station and/or a core network in response to a requirement that a first SIM in a terminal leaves a connected state, to enable the base station to determine to suspend a service corresponding to the first SIM according to a local configuration of the base station, and/or to enable the core network to determine to suspend the service corresponding to the first SIM according to a reason of the service corresponding to the first SIM and a local configuration of the core network; the indication information is configured to indicate that the first SIM leaves the connected state.

According to a seventh aspect of embodiments of the disclosure, a communication device is provided. The device includes: a processor; and a memory for storing computer programs; when the computer programs are executed by the processor, the above-mentioned method for suspending a service, performed by the base station, is performed.

According to an eighth aspect of embodiments of the disclosure, a communication device is provided. The device includes: a processor; and a memory for storing computer programs; when the computer programs are executed by the processor, the above-mentioned method for suspending a service, performed by the core network, is performed.

According to a ninth aspect of embodiments of the disclosure, a communication device is provided. The device includes: a processor; and a memory for storing computer programs; when the computer programs are executed by the processor, the above-mentioned method for indicating a suspension, performed by the terminal, is performed.

According to a tenth aspect of embodiments of the disclosure, a computer-readable storage medium is provided for storing computer programs, and when the computer programs are executed by a processor, steps in the above-mentioned method for suspending a service, performed by the base station, are performed.

According to an eleventh aspect of embodiments of the disclosure, a computer-readable storage medium is provided for storing computer programs, and when the computer programs are executed by a processor, steps in the above-mentioned method for suspending a service, performed by the core network, are performed.

According to a twelfth aspect of embodiments of the disclosure, a computer-readable storage medium is provided for storing computer programs, and when the computer programs are executed by a processor, steps in the above-mentioned method for indicating a suspension, performed by the terminal, are performed.

According to the embodiments of the disclosure, the base station may determine that the first SIM in the terminal needs to leave the connected state according to the indication information and further determine to suspend the service corresponding to the first SIM according to the local configuration of the base station. Therefore, for the common terminal and the multi-SIM terminal, when the SIM in the terminal needs to leave the connection state, the service corresponding to the SIM may be suspended, so that when the first SIM needs to continue for communication, for example, after the second SIM completes communication, it may quickly communicate with the base station to exchange user plane data without re-entering the connected state.

Furthermore, the base station may carry the reason of suspending the service corresponding to the first SIM in the suspension request that is sent to the core network, for example, the reason may be carried in the operation type information, so that the core network may determine that the reason of the base station requesting to suspend the service corresponding to the first SIM is the first SIM leaves the connected state and thus the core network may accurately determine whether to suspend the service corresponding to the first SIM according to the reason and the local configuration of the core network.

What is claimed is:

1. A method for suspending a service, performed by a base station, the method comprising:
   receiving indication information that a first subscriber identification module (SIM) in a multi-SIM user equipment (UE) leaves a connected state; and
   determining the first SIM to enter an inactive state or an idle state according to the indication information and a local configuration of the base station, wherein a local configuration of the base station comprises available resources locally configured in the base station or a policy locally configured in the base station;
   wherein in a case where the first SIM of the multi-SIM UE enters the inactive state, the context of the first SIM is retained.

2. The method of claim 1, wherein receiving the indication information that the first SIM in the multi-SIM UE leaves the connected state comprises:
   receiving the indication information from the first SIM; or
   receiving the indication information from a core network.

3. The method of claim 1, wherein determining the first SIM to enter the inactive state or the idle state according to the indication information and the local configuration of the base station comprises:
   determining the available resources locally configured in the base station being greater than a first resource threshold and sending a suspension request for suspending the service corresponding to the first SIM to a core network; and
   determining the available resources locally configured in the base station being less than the first resource threshold and sending a releasing request for releasing the service corresponding to the first SIM to the core network.

4. The method of claim 1, wherein determining the first SIM to enter the inactive state or the idle state according to the indication information and the local configuration of the base station comprises:
   determining the policy locally configured in the base station being able to suspend services and sending a suspension request for suspending the service corresponding to the first SIM to a core network; and
   determining the policy locally configured in the base station being unable to suspend services and sending a releasing request for releasing the service corresponding to the first SIM to the core network.

5. The method of claim 1, wherein determining the first SIM to enter the inactive state or the idle state according to the indication information and the local configuration of the base station comprises:
   determining the available resources locally configured in the base station being greater than a first resource threshold and a policy locally configured in the base station being able to suspend services and sending a suspension request for suspending the service corresponding to the first SIM to a core network.

6. The method of claim 1, further comprising:
   sending a suspension request for suspending the service corresponding to the first SIM to a core network, wherein the suspension request comprises a reason of suspending the service corresponding to the first SIM being that the multi-SIM UE leaves.

7. The method of claim 6, further comprising:

determining a duration in which the first SIM leaves the connected state; and sending the duration to the core network.

8. A method for suspending a service, performed by a core network, the method comprising:

receiving request for a first SIM in a multi-SIM user equipment (UE) to enter an inactive state or an idle state from a base station, wherein a reason for the multi-SIM UE requesting the first SIM to enter the inactive state or the idle state is that the multi-SIM UE leaves a connected state; and determining the first SIM to enter the inactive state or the idle state according to the reason and a local configuration of the core network, wherein the local configuration of the core network comprises available resources locally configured in the core network or a policy locally configured in the core network;

wherein in a case where the first SIM of the multi-SIM UE enters the inactive state, the base station and/or the core network retains the context of the first SIM.

9. The method of claim 8, wherein determining the first SIM to enter the inactive state or the idle state according to the reason and the local configuration of the core network comprises:

determining the available resources locally configured in the core network being greater than a second resource threshold and suspending the service corresponding to the first SIM, wherein the second resource threshold is associated with the reason; and determining the available resources locally configured in the core network being less than the second resource threshold and releasing the service corresponding to the first SIM.

10. The method of claim 8, wherein determining the first SIM to enter the inactive state or the idle state according to the reason and the local configuration of the core network comprises:

determining the policy locally configured in the core network being able to suspend services and suspending the service corresponding to the first SIM; and determining the policy locally configured in the core network being unable to suspend services and releasing the service corresponding to the first SIM.

11. The method of claim 8, wherein determining the first SIM to enter the inactive state or the idle state according to the reason and the local configuration of the core network comprises:

determining the available resources locally configured in the core network being greater than a second resource threshold and a policy locally configured in the core network being able to suspend services, and suspending the service corresponding to the first SIM wherein the second resource threshold is associated with the reason.

12. The method of claim 8, wherein the core network comprises an access and mobility management function (AMF) and a session management function (SMF), and the method further comprises:

sending by the AMF, an updating request for updating session management context of the service corresponding to the first SIM to the SMF, wherein the updating request comprises an operation type being a user plane suspension and a reason of the user plane suspension being the multi-SIM UE leaves;

determining the reason for the user plane suspension being that the multi-SIM UE leaves and updating the session management context of the service corresponding to the first SIM by the SMF.

13. The method of claim 8, further comprising:

determining a duration in which the first SIM leaves a connected state; and determining a period of suspending the service corresponding to the first SIM reaching the duration and releasing the service corresponding to the first SIM.

14. A method for indicating a suspension, performed by a user equipment (UE), the method comprising:

determining that a first SIM in the UE leaves a connected state, sending indication information to a base station and/or a core network, to enable the base station to determine the first SIM to enter an inactive state or an idle state according to the indication information and a local configuration of the base station, and/or to enable the core network to determine the first SIM to enter an inactive state or an idle state according to a reason for the UE requesting the first SIM to enter the inactive state or the idle state and a local configuration of the core network; wherein the reason for the UE requesting the first SIM to enter the inactive state or the idle state is that the UE leaves a connected state;

wherein the indication information is configured to indicate that the first SIM leaves the connected state;

wherein the local configuration of the base station comprises available resources locally configured in the base station or a policy locally configured in the base station, wherein the local configuration of the core network comprises available resources locally configured in the core network or a policy locally configured in the core network;

in the case of the first SIM of the UE enters the inactive state, the base station and/or the core network retains the context of the first SIM.

15. The method of claim 14, further comprising:

determining a second SIM being required for communication when the first SIM in the UE is in the connected state and determining that the first SIM leaves the connected state.

16. The method of claim 14, further comprising:

predicting, by the UE, a duration in which the first SIM leaves the connected state; and sending, by the UE, the duration to the base station and/or the core network.

17. A communication device, comprising:

a processor; and a memory for storing computer programs;

wherein the processor is configured to execute the computer program to perform the method for suspending a service according to claim 1.

18. A communication device, comprising:

a processor; and a memory for storing computer programs;

wherein the processor is configured to execute the computer program to perform the method for suspending a service according to claim 8.

19. A communication device, comprising:

a processor; and a memory for storing computer programs;

wherein the processor is configured to execute the computer program to perform the method for suspending a service according to claim 14.

20. A communication system, comprising:

a user equipment (UE);

a base station as claimed in claim 1, for communicating with the UE and a core network; and the core network.

* * * * *